(12) United States Patent
Hiroya et al.

(10) Patent No.: US 8,791,387 B2
(45) Date of Patent: Jul. 29, 2014

(54) LASER CUTTING METHOD, DISPLAY APPARATUS MANUFACTURING METHOD, AND DISPLAY APPARATUS

(75) Inventors: Tsutomu Hiroya, Tokyo (JP); Kouji Shigemura, Tokyo (JP)

(73) Assignee: NLT Technologies, Ltd., Kanagawa (JP)

(*) Notice: Subject to any disclaimer, the term of this patent is extended or adjusted under 35 U.S.C. 154(b) by 1347 days.

(21) Appl. No.: 11/727,026

(22) Filed: Mar. 23, 2007

(65) Prior Publication Data

US 2007/0241085 A1    Oct. 18, 2007

(30) Foreign Application Priority Data

Mar. 27, 2006   (JP) .................................. 2006-086628

(51) Int. Cl.
*B23K 26/00* (2014.01)

(52) U.S. Cl.
USPC ........ 219/121.72; 438/30; 438/460; 438/535; 219/121.6; 219/121.67; 219/121.8; 166/59

(58) Field of Classification Search
CPC .............................. B23K 26/409; B23K 26/40
USPC .............. 438/30, 460, 535; 166/59; 136/243; 219/121.6, 121.67, 121.72, 121.8
See application file for complete search history.

(56) References Cited

U.S. PATENT DOCUMENTS

| | | | |
|---|---|---|---|
| 5,489,321 A * | 2/1996 | Tracy et al. ........................ | 65/43 |
| 5,559,621 A * | 9/1996 | Minato et al. .................. | 349/155 |
| 5,622,540 A * | 4/1997 | Stevens ........................... | 65/112 |
| 5,707,745 A * | 1/1998 | Forrest et al. .................. | 428/432 |
| 6,057,221 A * | 5/2000 | Bernstein et al. ............. | 438/601 |
| 6,114,088 A * | 9/2000 | Wolk et al. .................... | 430/273.1 |
| 6,129,603 A * | 10/2000 | Sun et al. .......................... | 445/25 |
| 6,195,142 B1 * | 2/2001 | Gyotoku et al. ................ | 349/69 |
| 6,214,427 B1 * | 4/2001 | Levinson ........................ | 428/43 |
| 6,222,603 B1 * | 4/2001 | Sakai et al. .................... | 349/153 |
| 6,297,869 B1 * | 10/2001 | Choo et al. .................... | 349/187 |

(Continued)

FOREIGN PATENT DOCUMENTS

| | | | |
|---|---|---|---|
| JP | 01-271084 A | * | 10/1989 |
| JP | 5-305467 | | 11/1993 |

(Continued)

OTHER PUBLICATIONS

Parthasarathy and Kerans, Comprehensive Structural Integrity: Failure of Ceramic Composites 2.09, 2003, pp. 456-457, 460, 467-472.*

(Continued)

*Primary Examiner* — Dana Ross
*Assistant Examiner* — Brett Spurlock
(74) *Attorney, Agent, or Firm* — Young & Thompson

(57) ABSTRACT

To provide a laser cutting method that is capable of cutting the substrates high accurately with high throughput at a low cost. It is a laser cutting method for cutting a laminated substrate that is formed by laminating at least a pair of substrates. The method comprises the steps of: providing a pattern member with a characteristic of absorbing light of a wavelength that transmits each of the substrates, between each of the substrates along a cutting position of the laminated substrate; and irradiating a laser of the wavelength that transmits the substrates along the pattern member, whereby the laminated substrate is cut along the pattern member.

12 Claims, 24 Drawing Sheets

(56) References Cited

U.S. PATENT DOCUMENTS

| | | | |
|---|---|---|---|
| 6,489,588 B1* | 12/2002 | Hoekstra et al. | 219/121.67 |
| 6,580,489 B2* | 6/2003 | Choo et al. | 349/187 |
| 6,617,093 B2* | 9/2003 | Pokorny et al. | 430/200 |
| 6,770,842 B2* | 8/2004 | Nam et al. | 219/121.72 |
| 6,795,154 B2* | 9/2004 | Uh et al. | 349/158 |
| 6,822,725 B2* | 11/2004 | Choo et al. | 349/187 |
| 7,163,848 B2* | 1/2007 | Yamazaki et al. | 438/149 |
| 7,371,143 B2* | 5/2008 | Becken et al. | 445/25 |
| 7,542,125 B2* | 6/2009 | Kim et al. | 349/187 |
| 2001/0024766 A1* | 9/2001 | Kita et al. | 430/272.1 |
| 2002/0005905 A1* | 1/2002 | Yamazaki et al. | 348/294 |
| 2002/0027629 A1* | 3/2002 | Choo et al. | 349/122 |
| 2003/0022403 A1* | 1/2003 | Shimoda et al. | 438/14 |
| 2003/0206266 A1* | 11/2003 | Choo et al. | 349/187 |
| 2003/0210558 A1* | 11/2003 | Konagaya | 362/555 |
| 2004/0075112 A1* | 4/2004 | Yamazaki et al. | 257/200 |
| 2004/0179165 A1* | 9/2004 | Kinoshita et al. | 349/158 |
| 2004/0241934 A1* | 12/2004 | Inoue | 438/222 |
| 2005/0001545 A1* | 1/2005 | Aitken et al. | 313/512 |
| 2005/0088610 A1* | 4/2005 | Choo et al. | 349/187 |
| 2005/0117106 A1* | 6/2005 | Tatemura et al. | 349/153 |
| 2005/0123850 A1* | 6/2005 | Wolk | 430/199 |
| 2005/0233547 A1* | 10/2005 | Noda et al. | 438/459 |
| 2005/0236975 A1* | 10/2005 | Addington et al. | 313/504 |
| 2006/0040472 A1* | 2/2006 | Tamura et al. | 438/460 |
| 2006/0098155 A1* | 5/2006 | Choo et al. | 349/187 |
| 2006/0228974 A1* | 10/2006 | Thelss et al. | 445/24 |
| 2006/0286463 A1* | 12/2006 | Choi | 430/7 |
| 2007/0241085 A1* | 10/2007 | Hiroya et al. | 219/121.72 |
| 2008/0050888 A1* | 2/2008 | Garner et al. | 438/463 |
| 2008/0194079 A1* | 8/2008 | Yamamoto et al. | 438/462 |

FOREIGN PATENT DOCUMENTS

| | | | |
|---|---|---|---|
| JP | 10-096911 | | 4/1998 |
| JP | 10096911 A | * | 4/1998 |
| JP | 11-305214 | | 11/1999 |
| JP | 2002-094078 | | 3/2002 |
| JP | 2004-126054 | | 4/2004 |
| JP | 2004126054 A | * | 4/2004 |
| JP | 2004-245916 | | 9/2004 |
| JP | 2004-325888 | | 11/2004 |
| JP | 2004325888 A | * | 11/2004 |
| JP | 2005-338281 | | 12/2005 |
| JP | 2006-150499 A | * | 6/2006 |
| WO | WO 9844550 A1 | * | 10/1998 |
| WO | WO 2006-011608 A1 | * | 2/2006 |

OTHER PUBLICATIONS

Choi et al, Polymers for flexible displays, Feb. 2008, Prog. Polym. Sci. 33, pp. 608-611.*

Berndt et al, Adhesion Measurement of Films and Coatings, vol. 1: Measurment of adhesion for thermally sprayed materials, 1995, VSP—An imprint of BRILL, pp. 41-70.*

Japanese Office Action dated Sep. 27, 2011 in corresponding Japanese Application No. 2006-086628 with English translation of pertinent portion of Japanese Office Action.

* cited by examiner

IRRADIATE LASER TO GAP
RETAINING MEMBER AND BLACK
MATRIX FROM COUNTER
SUBSTRATE SIDE

PERFORM LASER
IRRADIATION & GAS COOLING
ON CUTTING POSITION

SUDDEN THERMAL STRESS GENERATED
AT IRRADIATED POSITION

IRRADIATED POSITION IS
SHIFTED & CRACKING IS EXPANDED

GAP RETAINING MEMBER IS HEATED

CRACKING GENERATED BY THERMAL STRESS

CUT SUBSTRATE BY EXPANSION OF CRACKING

GLASS SUBSTRATE IS HEATED

CRACKING GENERATED BY THERMAL STRESS

CUT SUBSTRATE BY EXPANSION OF CRACKING

LASER CUTTING METHOD, DISPLAY APPARATUS MANUFACTURING METHOD, AND DISPLAY APPARATUS

BACKGROUND OF THE INVENTION

1. Field of the Invention

The present invention relates to a laser cutting method that is used preferably for performing cutting processing on laminated substrates and the like, a method for manufacturing a display apparatus using the laser cutting method, and a display apparatus manufactured by employing the laser cutting method.

2. Description of the Related Art

Recently, a liquid crystal display apparatus has rapidly become widespread as a small-sized display apparatus for a projector apparatus, portable telephone, and the like by making the best use of its characteristics, i.e. it is capable of saving the power consumption, reducing the weight, or sliming the shape.

The liquid crystal display apparatus uses a liquid crystal as a light control element by controlling the transmittance of light through applying an electric field to the liquid crystal, thereby controlling the contrast to display an image. This liquid crystal is sandwiched between a stripe-type scanning electrode group and a stripe-type signal electrode group that is orthogonal to the scanning electrode group, and a voltage is applied to the intersections of those electrodes to drive the liquid crystal. This method is called a simple matrix drive. With this simple matrix drive, it is not possible to obtain a high display quality, and there is a limit set in the number of scanning lines.

In order to improve the aforementioned performance of the simple matrix drive, an active matrix system that has a switching element provided at each pixel is used widely. In particular, recently, a liquid crystal display apparatus that uses a thin film transistor for the switching element has become popular in general. As a material for forming the thin-film transistor, there is amorphous silicon. The thin-film transistor using amorphous silicon has been widely used conventionally, since it can be formed at low cost and can be easily formed in a large scale.

However, the amorphous silicon thin-film transistor has such a defect that the mobility of the electric charges is low. Thus, it is necessary to mount a driving circuit for driving the thin-film transistors in the vicinity of a display panel. Therefore, there is a limit in reducing the size of the liquid crystal display apparatus, and it has become unsuitable for the display apparatus of a portable telephone and the like, which requires reduction in the size, weight, and sliming the shape.

Upon this, a liquid crystal apparatus that uses a polycrystalline silicon thin-film transistor with high carrier mobility has become popular as a small-sized liquid crystal display apparatus. In the liquid crystal display apparatus using the polycrystalline silicon thin-film transistors, peripheral driving circuits can be formed on a same substrate. Thus, it is effective for narrowing the frame when a display area is narrow.

For improving the productivity of the liquid crystal display apparatuses, it is common to cut and separate the laminated substrates into individual display apparatuses, after laminating a counter substrate on which color layers are formed and a driving substrate that is a large-scaled glass substrate on which patterns of display apparatus constituted with a plurality of pixel driving thin-film transistors and driving circuits are formed. As a cutting method thereof, there is a way in which scribe lines are formed on the substrate by a diamond cutter, and then it is broken from the rear face.

However, with this cutting method using a cutter, chippings are generated on the cut face so that it becomes fragile. Therefore, the panel strength is deteriorated, thereby causing such issues that it is necessary to be washed and polished during the manufacturing step, etc.

As a method for improving such issue, Japanese Unexamined Patent Publication 05-305467 discloses a cutting method, in which: paint that absorbs laser beams is applied to the areas that correspond to the cutting position of a substrate; and a laser with a wavelength that transmits the substrate is irradiated from the opposite side of the surface where the paint is applied so as to generate a thermal stress in the irradiated areas for cutting the substrate. This laser cutting method is a noncontact cutting method, so that chippings are not generated in the cut face. Thus, a panel with a smooth cut face can be obtained.

This laser cutting method disclosed in Japanese Unexamined Patent Publication 05-305467 is designed for cutting a single glass substrate. Thus, there are following issues generated when cutting laminated substrates.

When laser beams are irradiated from the opposite side of the paint-applied face of one of the substrates, the laser beams are absorbed by the paint on one of the substrates. Thus, the laser beams are not irradiated to the paint of the other substrate that opposes to this substrate. Therefore, laser beams need to be irradiated separately to each of the substrates, thereby decreasing the throughput. Further, it requires a step for applying the paint, so that the productivity is decreased.

Further, with the conventional method using laser beams, as shown in FIG. 24A, it is necessary to irradiate laser beams separately from both sides, i.e. from the side of one glass substrate 101 and the side of other glass substrate 102. In this case, as shown in FIG. 24B, the laser-beam irradiated areas of the substrate glasses 101 and 102 are heated first. Then, as shown in FIG. 24C, cracking is generated in the heated areas. At last, there may cause such an inconvenience that the directions of each cracking are shifted as shown in FIG. 24D (it is cooled in a gap retaining member 103 in the center). Thus, the cutting accuracy becomes bad.

SUMMARY OF THE INVENTION

The object of the present invention therefore is to improve the issues of the above-described conventional case, and to provide: a laser cutting method that is capable of cutting the substrate highly accurately with high throughput at a low cost; a display apparatus manufacturing method using the cutting method, and a display apparatus obtained thereby.

In order to achieve the aforementioned object, the laser cutting method according to the present invention is a method for cutting a laminated substrate that is formed by laminating at least a pair of substrates by using a laser. The method comprises the steps of: providing a pattern member with a characteristic of absorbing light of a wavelength that transmits each of the substrates, between each of the substrates along a cutting position of the laminated substrate; and irradiating a laser of the wavelength that transmits the substrates along the pattern member, whereby the laminated substrate is cut along the pattern member. By the use of the laser that transmits the substrates, it is possible to cut the laminated substrate from the inner side thereof. Thus, the cutting accuracy can be improved.

The aforementioned pattern member may be formed with a gap retaining member that is provided between the pair of substrates.

When the gap retaining member is used as the pattern member for absorbing the laser that transmits the substrates, heat is transmitted to both of the laminated substrates through the gap retaining member, and thermal distortion is generated in both of them simultaneously. Therefore, both of the substrates can be cut simultaneously even though the laser is irradiated only from one side, thereby improving the productivity significantly.

Further, it may be constituted in such a manner that one of the pair of substrates is a driving substrate and other one is a counter substrate that is equipped with a display part and the like, and the method may comprise the step of, before laminating each of the substrates: forming a flattening film on the driving substrate and an overcoat layer on the counter substrate, respectively, except for a part where the gap retaining member is provided.

Since the flattening film and the overcoat layer are not formed right under the gap retaining member, the heat of the gap retaining member heated by the laser is transmitted directly to the substrates. Therefore, the cutting accuracy is improved and the speed of the cutting work can be increased.

Furthermore, it may be constituted in such a manner that a plurality of external connecting terminals are provided at an edge part of the driving substrate; and a black matrix that is a black straight line for performing laser cutting is provided to the counter substrate at an area opposing to the external connecting terminals, before laminating the substrates.

With this, only a part of the counter substrate side can be cut, thereby allowing the external connecting terminals of the driving substrate to be exposed to the outside. Therefore, the productivity can be improved significantly.

Further, the aforementioned gap retaining member may be formed with a member that has conductivity as well as a characteristic of absorbing the light of the wavelength that transmits the substrates.

Since the conductivity is given to the gap retaining member, the electricity can be supplied to the counter substrate side through the gap retaining member. Thus, unlike the conventional case, it becomes unnecessary to mix a conductive gap material into the binding member for supplying the electricity though the binding member. With this, in addition to reducing the manufacturing cost, deterioration of the binding agent by the heat that is generated in accordance with the supply of electricity to the binding member can be suppressed greatly. Therefore, the durability of the display apparatus formed by the above-described method can be improved remarkably.

Furthermore, the present invention may be constituted in such a manner that a display apparatus is obtained by cutting a plurality of display apparatus parts formed by laminating the pair of substrates by the above-described laser cutting method, wherein one of the substrate is equipped with a plurality of display driving devices, and the other substrate comprises a plurality of display devices which correspond to the display driving devices and are driven by the display driving devices.

Further, the manufacturing method of a display apparatus may comprise the steps of: sectioning a plurality of organic light-emitting display apparatus parts formed on a same substrate that is constituted with an organic light-emitting display part and a driving device for driving the organic light-emitting display part, with a black matrix for laser cutting; and irradiating laser beams for cutting along a pattern of the black matrix, whereby the organic light-emitting display apparatuses are formed through cutting and separating the plurality of organic light-emitting display apparatus parts individually.

Furthermore, the aforementioned display devices may be liquid crystal display devices formed by a liquid crystal dropping type injection method.

The gap retaining member or laser irradiation pattern of the black matrix or the like may be in a shape selected from a circle, a triangle, and the like. Further, the display apparatus may be manufactured by each of the manufacturing methods of the display apparatus described above.

The present invention uses the laser cutting method of the high cutting accuracy, so that the cutting margin becomes unnecessary and the narrow-framed display device can be obtained. At the same time, since the laser of the wavelength that transmits the substrates is irradiated to the gap retaining member, the heat can be transmitted to both of the laminated driving substrate and counter substrate to cut them. Thus, both substrates can be cut with the irradiation only form one side, so that the productivity can be improved significantly.

Moreover, with the manufacturing method of the display apparatus using the laser cutting method of the present invention and the display apparatus obtained thereby, it is possible to improve the productivity and the durability.

BRIEF DESCRIPTION OF THE DRAWINGS

FIG. 1 illustrates a manufacturing method of a pixel-driving polycrystalline silicon thin-film transistor of a driving substrate according to a first embodiment of the present invention, in which

FIG. 5 illustrates a manufacturing method of a counter substrate that is formed by corresponding to the driving substrate shown in FIG. 1-FIG. 3, in which

FIG. 6 illustrates the corresponding relation between the driving substrate and the counter substrate shown in FIG. 1-FIG. 5, in which

FIG. 7 illustrates the structure of the counter substrate side shown in FIG. 5, in which

FIG. 9 illustrates the state where the liquid crystal driving element part of the driving substrate and the liquid crystal driving element part of the counter substrate shown in FIG. 8 are being laminated, in which

FIG. 10 illustrates the state of laser cutting performed after the driving substrate and the counter substrate are laminated, in which

FIG. 11 is a schematic depiction for showing the principle of laser cutting, in which

FIG. 12 is a schematic depiction of the laser cutting steps according to the first embodiment, in which

FIG. 14 is an illustration for showing a third embodiment of the present invention, which is a fragmentary cross section of a part (the vicinity of a binding member of the driving substrate and the counter substrate) of the liquid crystal driving element part right before the laser cutting, in which

FIG. 15 illustrates a fourth embodiment of the present invention, in which

FIG. 17 illustrates the fifth embodiment of the present invention, in which

FIG. 20 illustrates the fifth embodiment of the present invention after the liquid crystal driving elements are laminated, in which

FIG. 21 illustrates a sixth embodiment of the present invention, in which

FIG. 22 illustrates a seventh embodiment of the present invention, in which

DETAILED DESCRIPTION OF THE PREFERRED EMBODIMENTS

Preferred embodiments of the present invention will be described hereinafter by referring to the accompanying drawings.

[Emobodiment 1]

FIG. 1-FIG. 16 illustrate a first embodiment.

In the first embodiment, first, the manufacturing procedures of a substrate (driving substrate) 1 and the other substrate (counter substrate) 18 for display are described, respectively, which are used when mass-producing liquid crystal display apparatuses that utilize liquid crystal display elements, and various functions of a gap retaining member 21 as a pattern member that constitutes the main part of the embodiment will be clearly presented.

In the first embodiment, a display area refers to the part where the liquid crystal display apparatus can control the transmission of light. Further, a non-display area refers to other driving circuit areas such as the pixel-driving polycrystalline silicon thin-film transistor area, a wiring area between the pixels, and the like.

FIG. 1A-FIG. 1J are cross sectional views of the steps for describing a manufacturing method of the pixel-driving polycrystalline silicon thin-film transistor used in the first embodiment.

(Driving Circuit Substrate 100A)

Figure 1A:
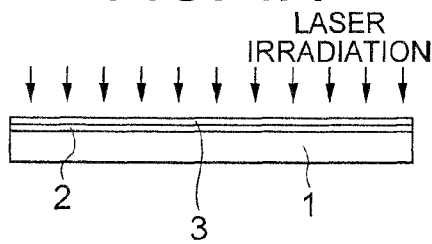
FIG. 1A-FIG. 1J show the steps of the manufacturing method, respectively.
Figure 1B:
Figure 1C:
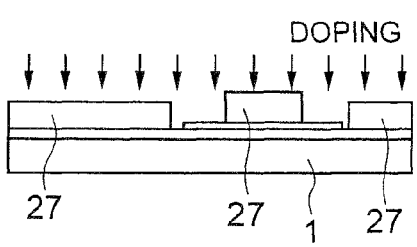

First, after forming a base insulating film 2 on a driving substrate 1 that is made of a glass substrate, amorphous silicon is grown thereon. The amorphous silicon is changed into polycrystalline silicon by performing annealing with a laser (FIG. 1A). Then, an island area of the polycrystalline silicon is formed through a photolithography step (FIG. 1B).

Figure 1D:
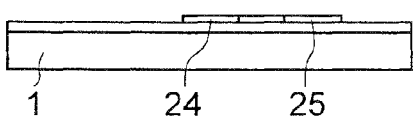
Figure 1E:
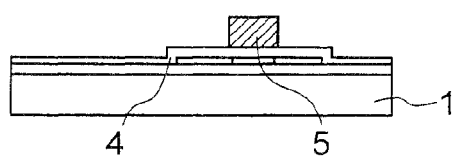
Figure 1F:
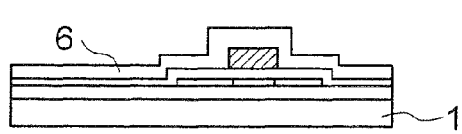
Figure 1G:
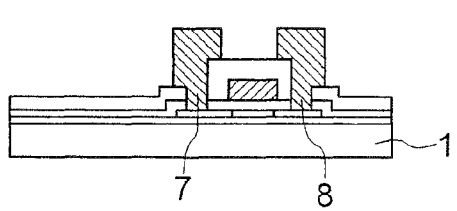

Subsequently, patterning of photoresist 27 is performed, and ion doping is carried out thereon (FIG. 1C), and a source region 24 and a drain region 25 are formed (FIG. 1D). Thereafter, a gate oxide film 4 is formed on the polycrystalline silicon, and a gate electrode 5 is subsequently formed in a prescribed area over the gate oxide film (FIG. 1E). Then, a lower insulating film 6 is formed over the entire surface of the substrate (FIG. 1F). A contact hole is formed through the source region 24 and the drain region 25, and a source electrode 7 and a drain electrode 8 are provided to be electrically connected to each of the source region 24 and the drain region 25 (FIG. 1G).

Figure 1H:
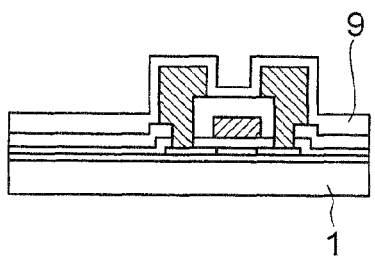
Figure 1I:
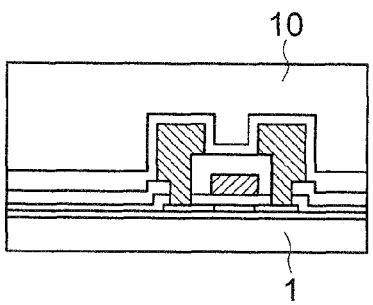

After forming the gate electrode 5 and the drain electrode 8, an interlayer insulating film 9 is formed over the entire surface of the driving substrate 1 (FIG. 1H). Further, an upper insulating film 10 is formed for flattening the unevenness on the surface (FIG. 1I).

In the embodiment, an inorganic insulating film is used for the interlayer insulating film 9 so that it does not react with each of the source electrode 7 and the drain electrode 8, while an organic resin having a large flattening effect is used for the upper insulating film 10.

Figure 1J:
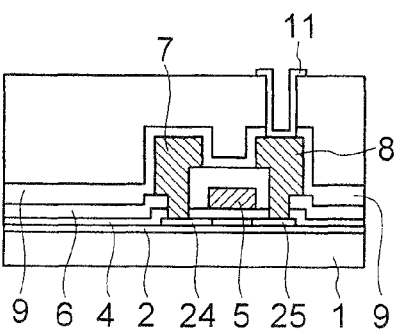

A contact hole is formed through the interlayer insulating film 9 and the upper insulating film 10 on the drain electrode 8, and a pixel electrode 11 is formed to be connected electrically to the drain electrode 8 (FIG. 1J). The pixel electrode 11 is formed with a material that exhibits penetrability for the visible light. Further, photolithography technique is used herein for providing the gate electrode 5, the source electrode 7, the drain electrode 8, and the pixel electrode 11.

Figure 2:
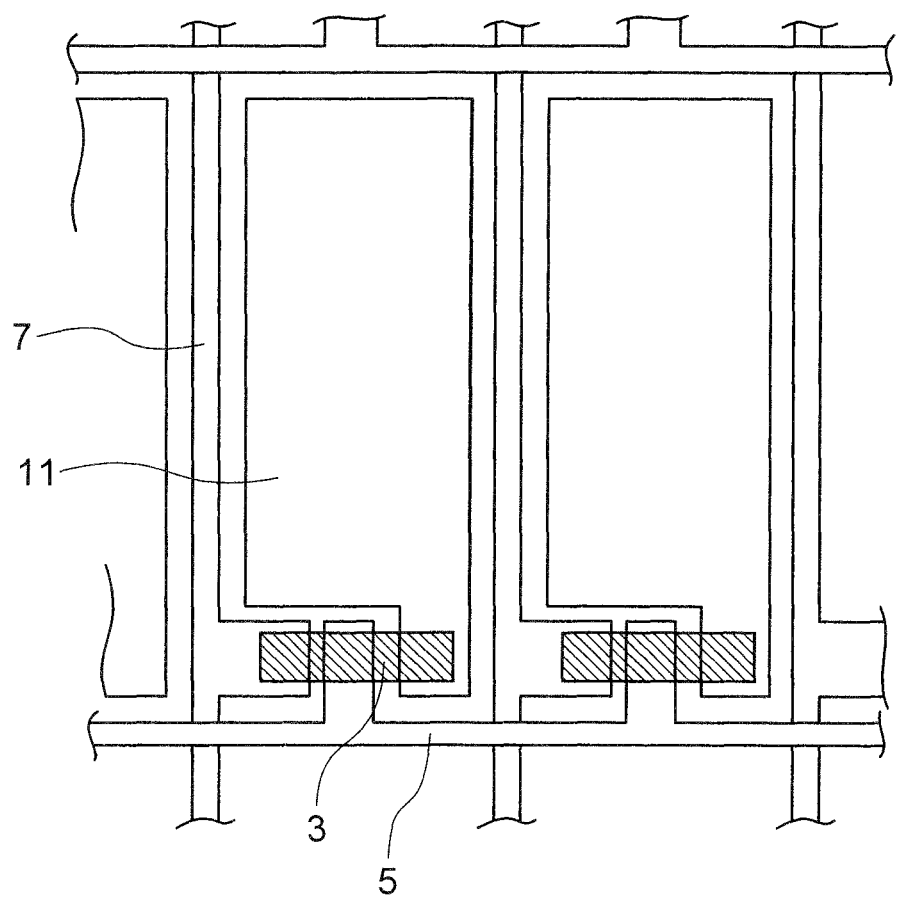
FIG. 2 is a plan view for showing a part of a pixel area of the driving substrate that is formed by the method shown in FIG. 1.

FIG. 2 (plan view) shows the schematic view of the pixel area that is formed by using the above-described method. In FIG. 2, only the elements of the main part are illustrated, and others are omitted.

Figure 3:
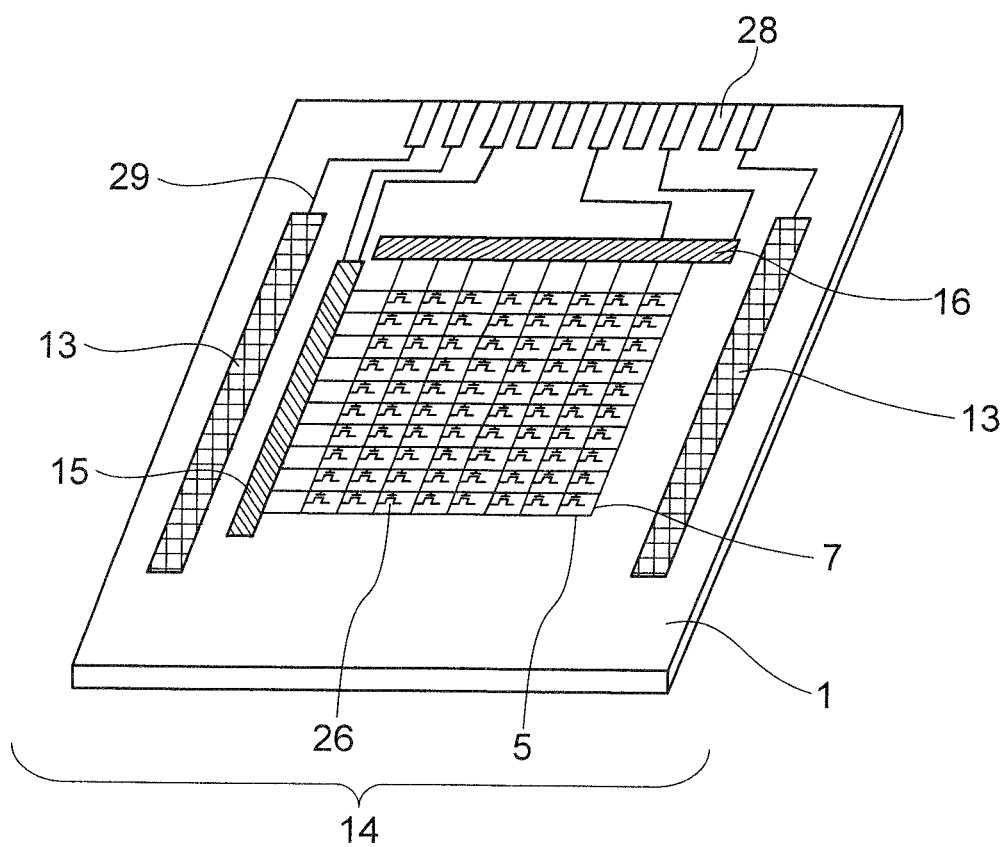
FIG. 3 is an illustration for describing the entire structure of the driving substrate side including the pixel area that is shown in FIG. 2 (liquid crystal driving element of the driving substrate side)

A pixel area 26 of the driving substrate 1, in which a plurality of the pixel areas shown in FIG. 2 are arranged, is formed in matrix as in FIG. 3. The pixel area 26 is connected through the gate electrode 5 to a gate-line driving circuit 15 (formed with the polycrystalline silicon transistor formed by the above-described method) which is provided outside the display area. Similarly, it is connected through the source electrode 7 to a source-line driving circuit 16 that is outside the display area.

A transfer electrode 13 for connecting to the opposing electrode 18 is formed in a part of the area where a binding member is to be formed when laminating the source-line driving circuit 16 and the counter substrate 18. It is desirable to form the transfer electrode 13 on the same surface as that of the pixel electrode 11. There are cases where it is not necessary to form the transfer electrode 13, depending on the driving method of the liquid crystals.

The source-line driving circuit 16 and the transfer electrode 13 are connected electrically to an external connecting terminal 28 through an external connecting wiring 29 to be able to connect to the outside.

Figure 4:
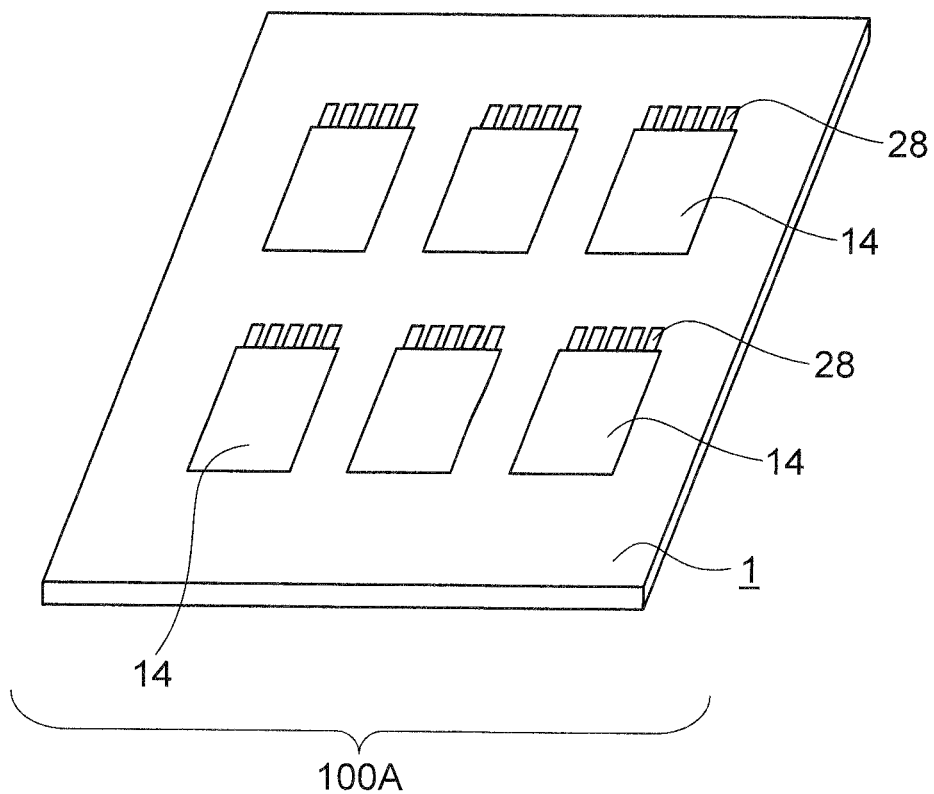
FIG. 4 is an illustration for describing the state right after forming a plurality of the liquid crystal driving elements shown in FIG. 3 on a driving substrate.

A plurality of liquid crystal driving elements 14 of the driving substrate 1, which are constituted with the pixel-driving polycrystalline silicon thin-film transistors and the driving circuits formed through the above-described steps, are formed in matrix on a large-scaled glass substrate, thereby forming a driving circuit substrate 100A (FIG. 4).

(Opposing Display Substrate 100B)

Next, a forming method of the counter substrate 18 that opposes to the driving circuit substrate 100A will be described by referring to FIG. 5.

Figure 6A:
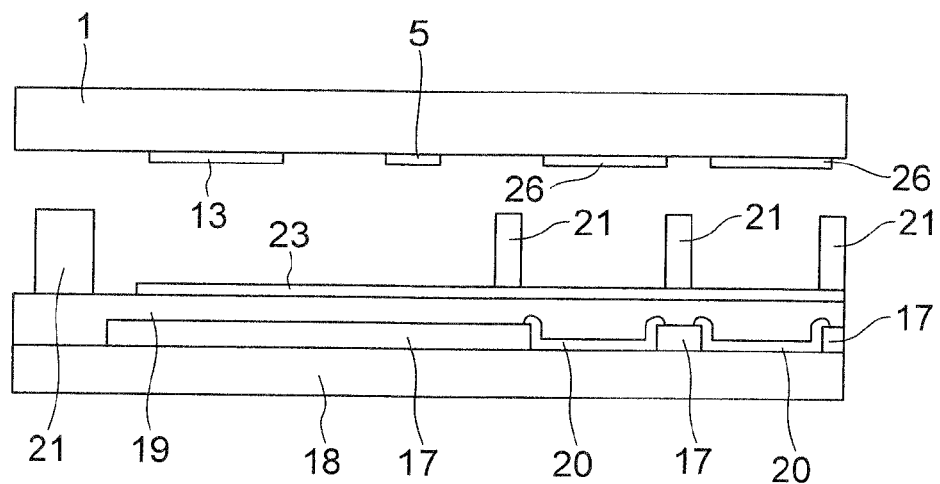
FIG. 6A is an illustration for describing the state where the driving substrate and the counter substrate are disposed by opposing to each other.
Figure 6B:
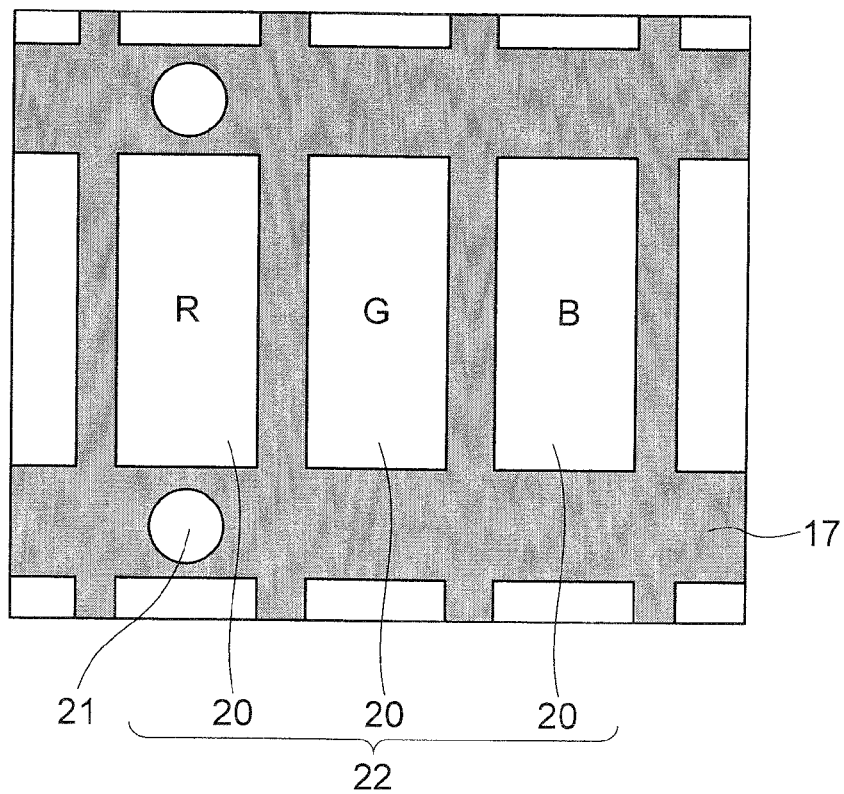
FIG. 6B is an illustration for describing an example of the pixel part formed on a display part of the counter substrate.
Figure 7A:
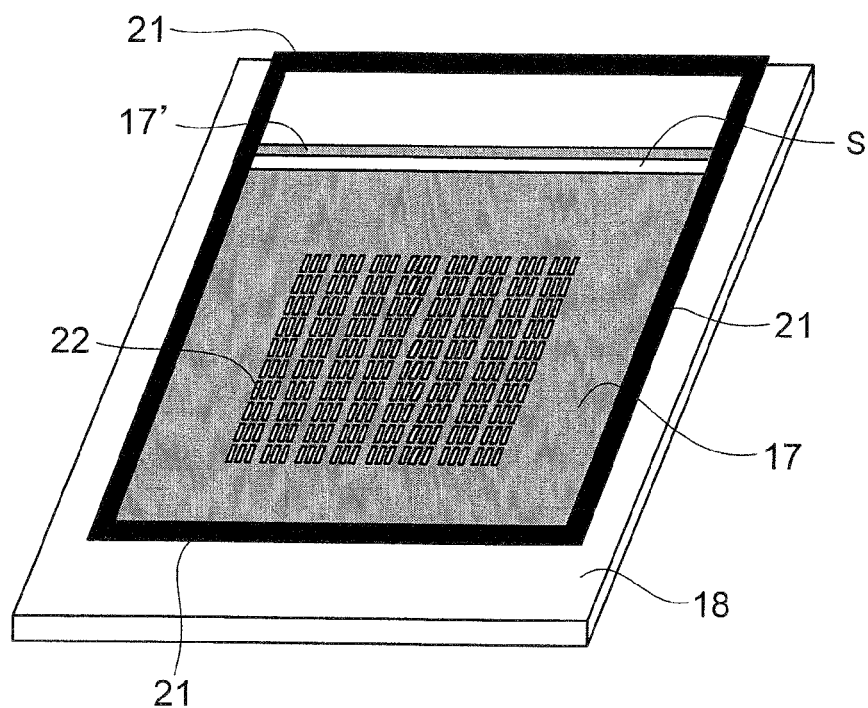
FIG. 7A is an illustration for describing the liquid crystal driving element part of the counter substrate side.

FIG. 5A-FIG. 5E are illustrations of the steps for describing the manufacturing method of the counter substrate 18 used in the first embodiment. Further, FIG. 6A shows the state where the driving substrate 1 and the counter substrate 18 are arranged to face each other. Furthermore, FIG. 6B is a plan view of the pixel part of the counter substrate 18, and FIG. 7A is a perspective view of the liquid crystal driving element of the counter substrate 18.

Figure 5A:
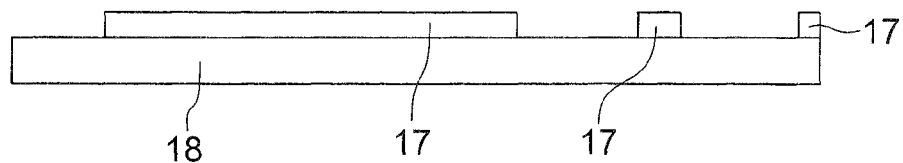
FIG. 5A-FIG. 5E show the steps of the manufacturing method, respectively.

As shown in FIG. 5A, a black matrix 17 provided with a light reflecting function is formed on the counter substrate 18 that is constituted with a glass substrate, in an area that opposes to the non-display area such as the pixel-driving polycrystalline silicon thin-film transistors, wirings, driving circuits of the above-described driving substrate 1. The black matrix is formed by a photolithography step with a metal that does not transmit the visible light, e.g. aluminum, chrome.

Figure 5B:
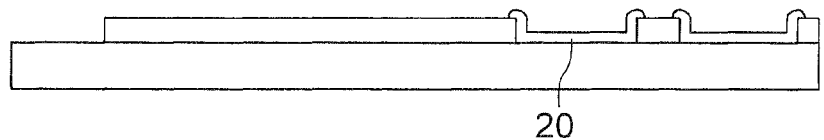

Next, as shown in FIG. 5B, color layers 20 of three colors red(R), green (G), and blue (B) are formed as color filters, respectively, by photolithography steps in a part to be a display area, i.e. in the area opposing to the pixel electrode 11 of the driving substrate 1. FIG. 6B shows this state in a plan view.

Figure 5C:
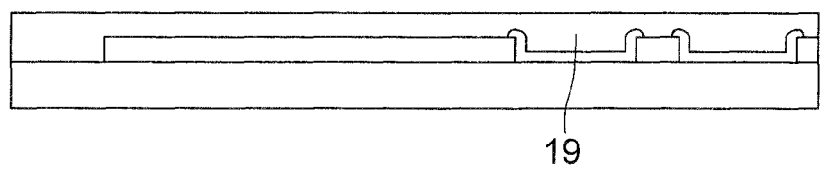

Subsequently, as shown in FIG. 5C, an overcoat layer 19 is formed over the entire surface of the counter substrate 18 to ease the unevenness that is generated due to a difference in the film thicknesses of the color layers and the black matrix. The overcoat layer 19 is desirable to be formed with an organic resin or the like with a large flattening effect. However, the overcoat layer 19 may become unnecessary, depending on the characteristic of the display apparatus.

Figure 5D:
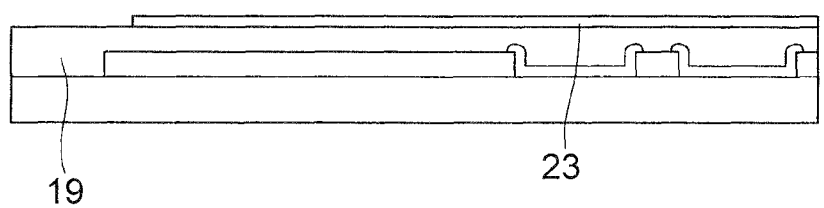

As shown in FIG. 5D, an opposing electrode 23 is provided on the overcoat layer 19. It is necessary for the opposing electrode 23 and the transfer electrode 13 on the driving substrate 1 to be connected. Thus, it is desirable to form the opposing electrode 23 over the entire surface of the counter substrate 18.

When disposing the opposing electrode 23, as shown in FIG. 6A, it is disposed widely from the area opposing to the pixel area 26 of the driving substrate 1 to the area opposing to the transfer electrode 13 of the driving substrate 1.

Figure 5E:
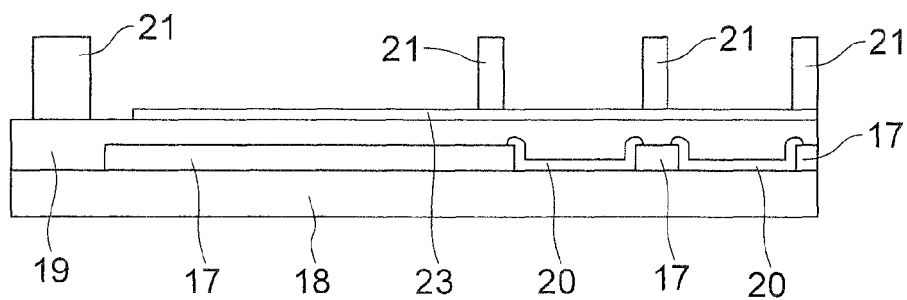

Further, as shown in FIG. 5E, a gap retaining member 21 is formed with an organic resin by photolithography on the part that opposes to the non-display area (at least the pixel-driving polycrystalline silicon thin-film transistor or the wiring) of the driving substrate 1. It is desirable to dispose the gap retaining member 21 on the counter substrate 18 side uniformly with a constant density.

At the same time, the gap retaining member 21 is also formed in the part opposing to the cut position of the driving substrate 1 side used for cutting a panel (formed by laminating the driving substrate 1 and the counter substrate 18).

As shown in FIG. 7A, there are cases where the cutting position of the driving substrate 1 and that of the counter substrate 18 are shifted, since there are the external connecting terminals on the driving substrate 1 on the connecting terminal side. It is desirable to form a black matrix 17' on the cutting position (FIG. 7B), without forming the gap retaining member 21 at the cutting position that corresponds to the connecting terminal side of the counter substrate 18. Further, in the embodiment, there is a space S provided between the black matrix 17' on the cutting position and the black matrix 17 on the pixel area so that the heat by laser irradiation is not transferred from the cutting position to the pixel area.

The organic resin used as the gap retaining member 21 may be any kinds as long as it has a characteristic of absorbing the light of wavelength that transmits the glass, and the absorptivity thereof for at least the wavelength of the laser used for cutting is good. Examples of the desirable organic resin in this case are acryl resins containing an infrared ray absorbing dye such as a phthalocyanine dye, e.g. a cyanine dye, a polymethine dye, a copper phthalocyanine dye, or a naphthalocyanine dye, a dithiol metal complex dye, a triphenylmethane dye, an aminium dye, or a diimonium dye, and an acryl resin containing black pigment that absorbs the visible light.

Figure 7B:
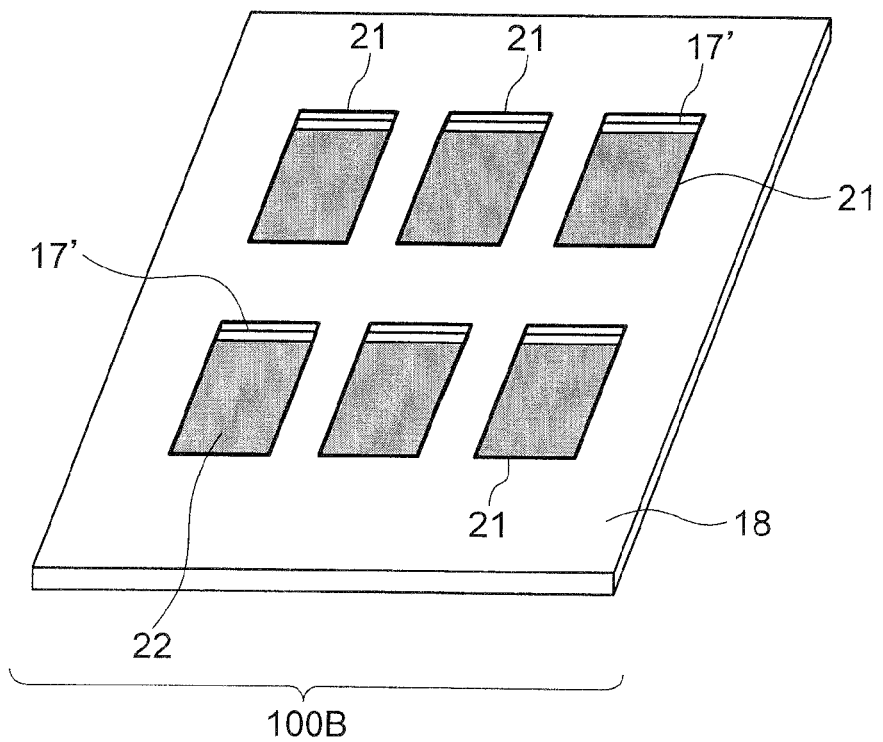
FIG. 7B is an illustration for describing the state right after forming a plurality of the liquid crystal driving elements shown in FIG. 7A on the driving substrate.

A plurality of the liquid crystal driving elements 22 of the counter substrate 18 side, which oppose to the liquid crystal driving elements of the driving substrate 1 side, are formed in matrix on a large-scaled glass substrate with the color layers, the black matrix, and the gap retaining member 21 as shown in FIG. 7B, thereby forming a display-side counter substrate 100B.

Figure 8:
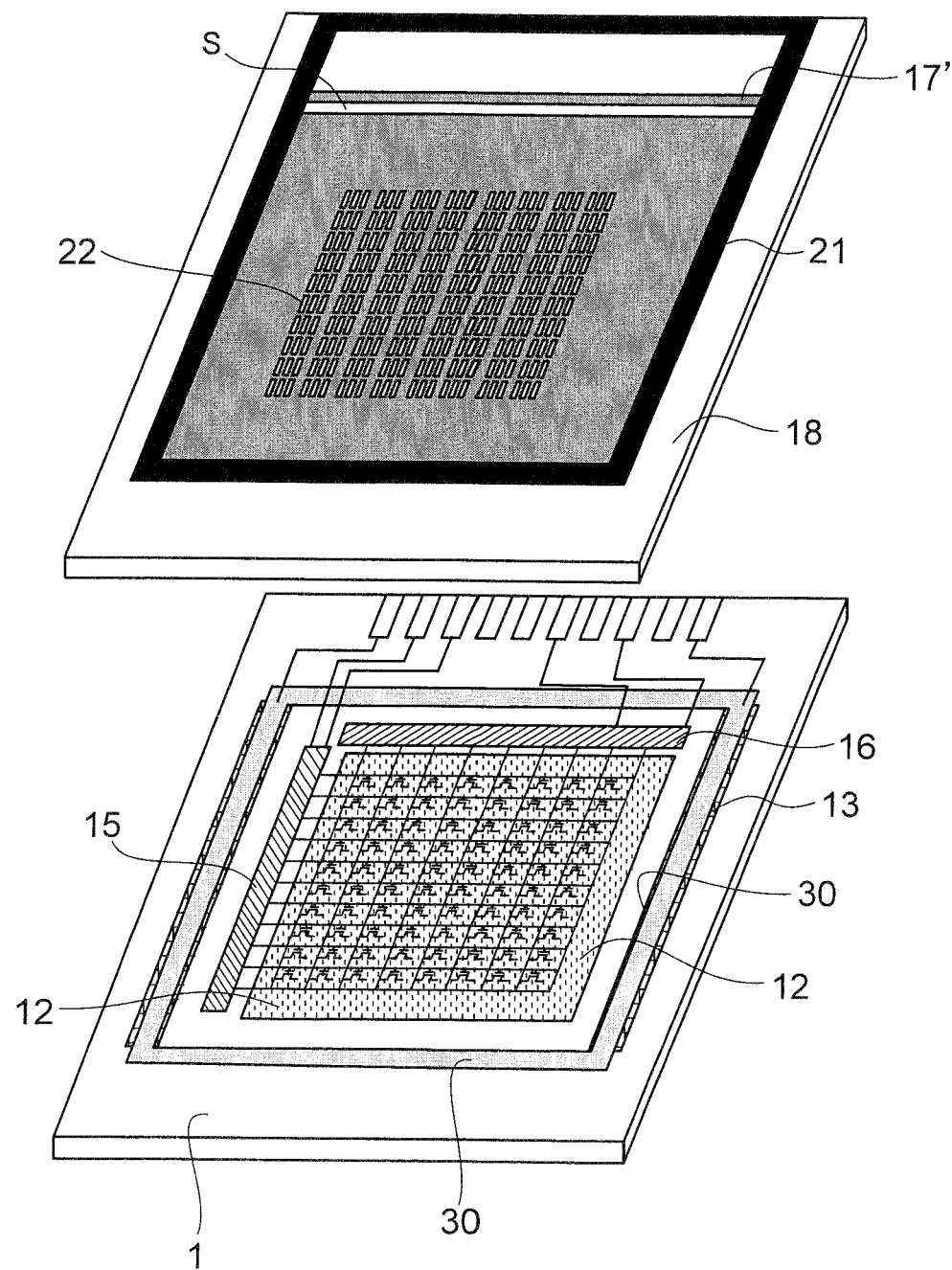
FIG. 8 illustrates a case where an alignment film is formed on the liquid crystal driving element part of the driving substrate side shown in FIG. 3 and the liquid crystal driving element part of the counter substrate side shown in FIG. 7A, which describes the state before both liquid crystal driving elements are being laminated.
Figure 9A:
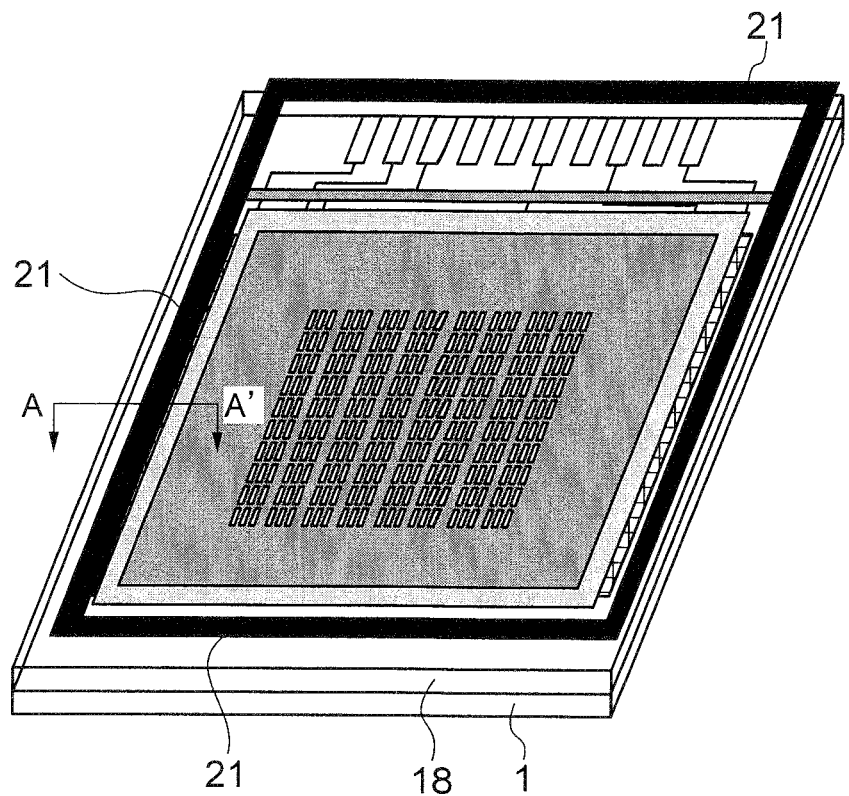
FIG. 9A is an illustration for describing the whole state.
Figure 9B:
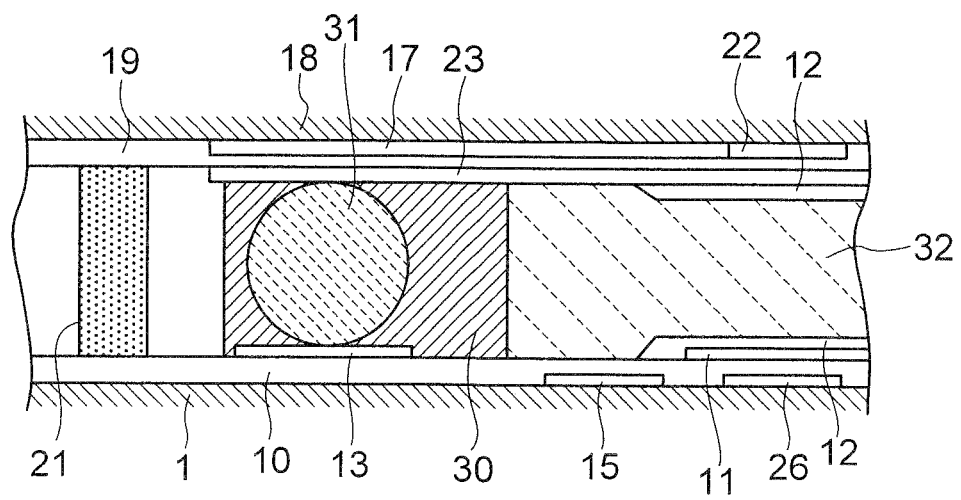
FIG. 9B is a fragmentary sectional view taken along the line A-A' of FIG. 9A.

An alignment film 12 is formed by printing on the display areas of both the driving substrate 1 and the counter substrate 18 formed by the above-described method (see FIG. 8 and FIG. 9B). Thereafter, alignment processing for aligning the liquid crystals on the surface of the alignment film 12 is performed. As the method for performing the alignment processing, rubbing processing and ion beam technology are performed. There are cases where the alignment processing becomes unnecessary, depending on the alignment mode of the liquid crystals. Subsequently, a binding member 30 is formed along the outside of the display area.

When performing liquid crystal drop injection, the liquid crystal is dropped on either one of the substrates before laminating the driving substrate 1 and the counter substrate 18, and the substrates are laminated thereafter (FIG. 9A).

FIG. 9B is a cross section taken along the line A-A' of FIG. 9A. As shown in FIG. 9B, a conductive gap agent 31 is mixed to the binding member 30 for electrically connecting the transfer electrodes 13, 23 of both substrates 1, 18. A circled part in the drawing depicts the mixture of the conductive gap agent 31. The binding member 30 is formed on the driving substrate 1 side in the first embodiment, however, it may be formed on the counter substrate 18.

Figure 10A:
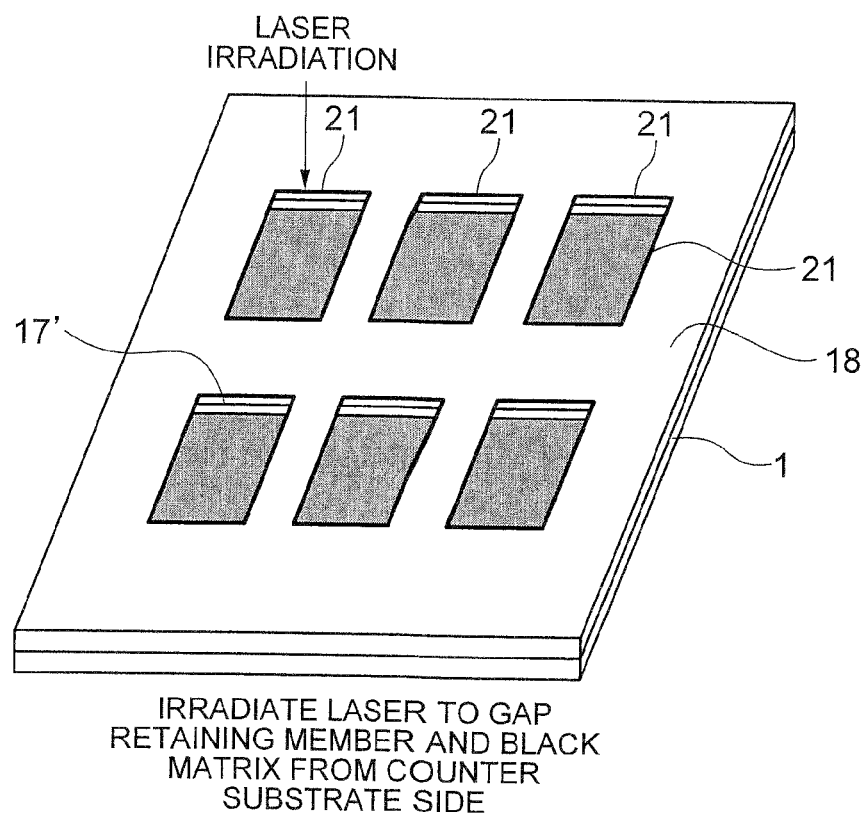
FIG. 10A is an illustration for describing the irradiation state of laser beams.
Figure 10B:
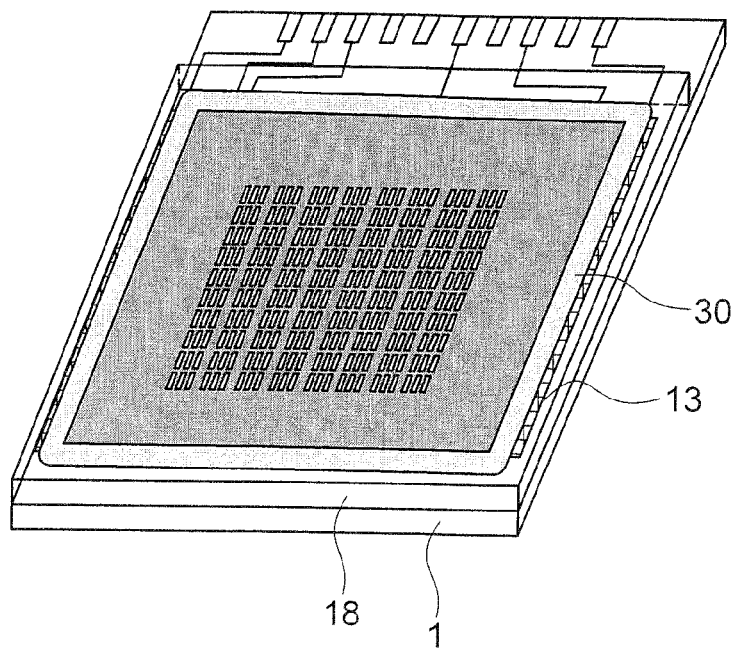
FIG. 10B is a schematic perspective view for showing the liquid crystal driving element after being cut off.

Next, as shown in FIG. 10A, after laminating the driving substrate 1 and the counter substrate 18, the laminated substrates are cut into the individual display apparatuses by irradiating a laser of the wavelength that transmits the substrate from the counter substrate 18 side along the cutting position of the substrate, on which the gap retaining member 21 having the characteristic to absorb the light is formed. The laser is irradiated to the gap retaining member 21 and the black matrix 17' from the counter substrate 18 side. FIG. 10B shows the liquid crystal driving element after being cut out. At that time, it is desirable to cut the driving substrate 1 and the counter substrate 18 at once also in the area around the terminal side where the gap retaining member 21 is not formed, through irradiating the laser from the counter substrate 18 side. This can be achieved with the embodiment, as it will be described later.

As the laser that transmits the glass substrate, YAG laser, semiconductor laser, or femtosecond laser using an ytterbium as a light oscillating material may be used.

As described above, the light absorbing member is the gap retaining member 21, so that it is in contact with both the driving substrate 1 and the counter substrate 18. Thus, the heat of the gap retaining member 21 heated by the laser irradiation is transmitted from the inner side to both substrates to cut them thereby. Therefore, it is possible to cut the laminated substrates at once by simply irradiating the laser from one side (see FIG. 12).

In this case, laser cutting can be achieved without increasing the number of steps, since the gap retaining member 21 is used as the light absorbing member in this embodiment.

Figure 11A:
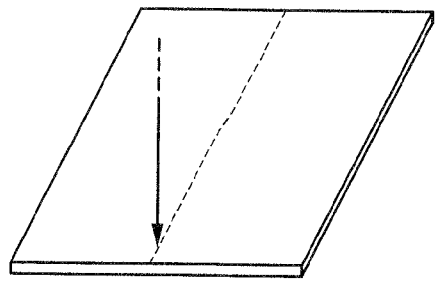
FIG. 11A is an illustration for describing the state where laser beams are irradiated at the laser irradiation start position.
Figure 11B:
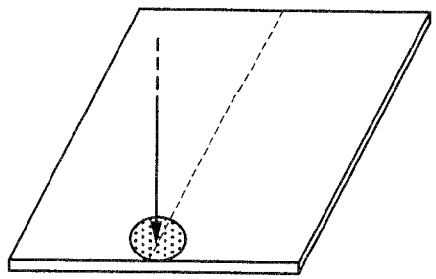
FIG. 11B is an illustration for describing the state where there is a sudden thermal reaction generated at the laser irradiated position.
Figure 11C:
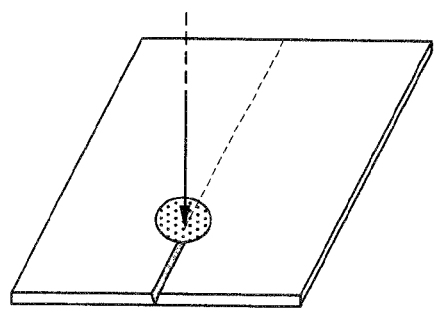
FIG. 11C is an illustration for describing the cutting action by the laser beams.

FIG. 11 and FIG. 12 illustrate the principle of the laser cutting in a simple manner.

Figure 12A:
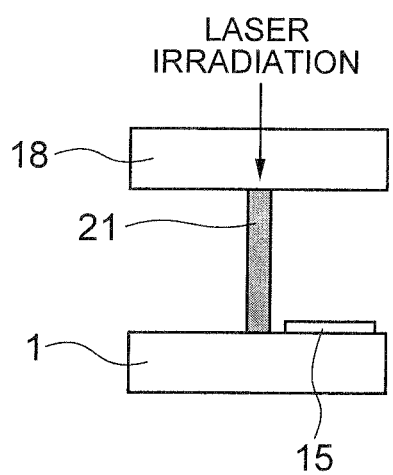
FIG. 12A is an illustration for describing the start position of laser irradiation.
Figure 12B:
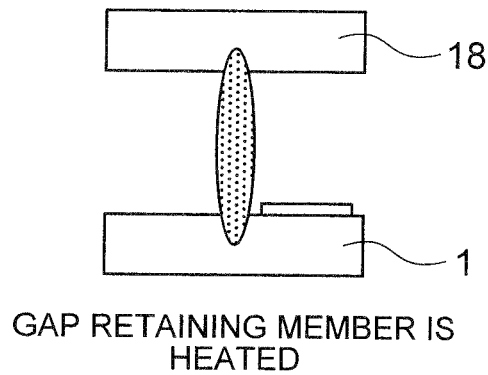
FIG. 12B is an illustration for describing the state where the gap retaining member is heated.
Figure 12C:
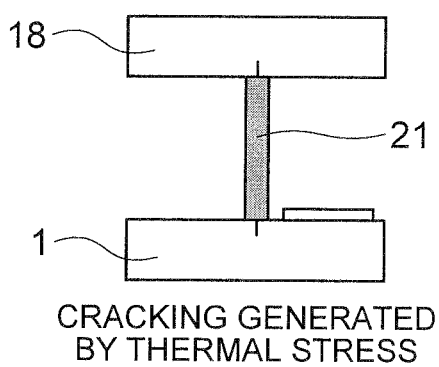
FIG. 12C is an illustration for describing the state where cracking is generated on the driving substrate side and the counter substrate side by the thermal stress.
Figure 12D:
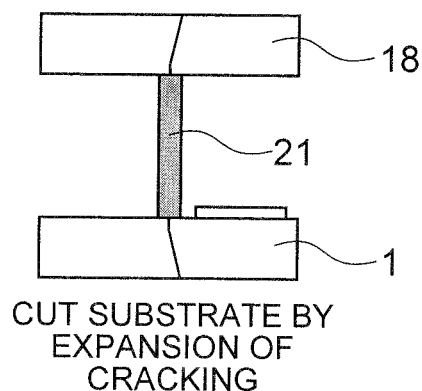
FIG. 12D is an illustration for describing the state where the substrate is cut as the cracking evolves.

First, as shown in FIG. 11, laser beams that transmit through the substrates 1 and 18 are used in the first embodiment. Therefore, as shown in FIG. 12, heat is generated on the surfaces (inner opposing faces of each of the substrates 1 and 18) of the driving circuit 15 side where the gap retaining member 21 as the light absorbing member is disposed. With this, the substrates 1 and 18 are to be cut from the surfaces on the circuit side (FIGS. 12B, 12C, 12D).

For the aforementioned conventional case, as shown in FIG. 24, when it is cut with a laser of the wavelength that is absorbed by the substrates (particularly, when cutting a glass substrate by a $CO_2$ laser), the substrates are cut from the laser irradiated surface, which is opposite side of the surface where the circuits are formed. In this case, cracking generated at the opposite surface may be shifted slightly before reaching the circuit side surface. As a result, the cutting accuracy is deteriorated.

With the first embodiment, however, the substrates can be cut at the part formed by photolithography. Thus, it is possible to cut them with about the same accuracy as that of the photolithography. Such cutting can be achieved since the YAG laser, a Ti sapphire semiconductor laser, and the like are hardly absorbed to the glass.

Further, it is possible to achieve cutting with almost no thermal diffusion by a strong electronic vibration through using the femtosecond laser for the laser. Thus, the influence to the driving circuits and the like by the heat can be decreased.

Furthermore, it is also possible to cut the substrates by: irradiating a laser that transmits the substrates, e.g. the YAG laser, with a low output (in such an extent that the glass is not completely cut) to generate minute cracking; and then irradiating a laser that is absorbed to the substrate, e.g. $CO_2$ laser, to the minute cracking. In this case, the amount of heat generated in the substrate is relatively small, so that the influence to the driving circuit near the cutting position can be reduced. In the case where thermally sensitive elements are provided in the vicinity of the cutting position, high reliability can be obtained by using this method.

Unlike the case of cutting by a cutter, it is possible with the laser cutting to irradiate the laser to arbitrary places. Therefore, in addition to linear cutting, the laser cutting is capable of cutting the liquid crystal display apparatuses in arbitrary shapes.

In addition, it is unnecessary to consider a cutting margin when designing the liquid crystal display apparatus, since the cutting accuracy is high. As a result, it is possible to manufacture the narrow-framed liquid crystal apparatuses.

Embodiment 2

Figure 13:
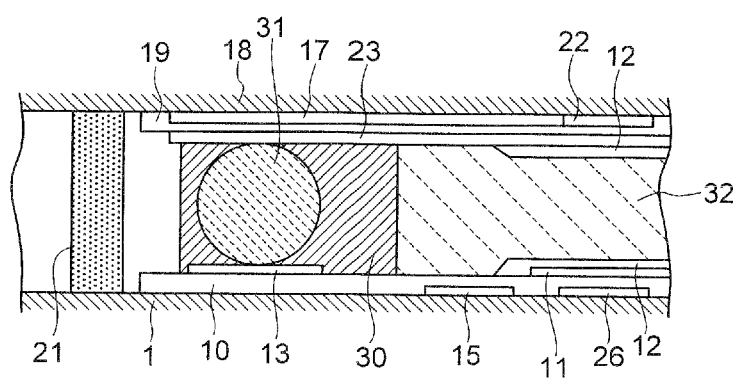
FIG. 13 is an illustration for showing a second embodiment of the present invention, which is a fragmentary cross section of a part (the vicinity of a binding member of the driving substrate and the counter substrate) of the liquid crystal driving element part right before the laser cutting.

FIG. 13 shows a second embodiment of the present invention.

FIG. 13 is a fragmentary cross sectional view for showing the cross section of the liquid crystal element part near the connected area right before being cut by the laser.

The second embodiment shown in FIG. 13 differs from the first embodiment shown in FIG. 9B that is a cross section taken along the line A-A' of FIG. 9A, in respect that the flattening film on the driving substrate 1 side right under the gap retaining member 21 and the overcoat layer on the counter substrate 18 side are removed in advance.

In the structure of the second embodiment shown in FIG. 13, the gap retaining member 21 is directly in contact with the glass substrate so that the thermal conductivity to the glass is high. Thus, the substrate can be cut with a low laser output. Therefore, the cutting work of the substrate can be executed with a low laser output, which provides an advantage that an adverse effect such as thermal breakdown of the elements in the vicinity of the cutting position can be eased.

Other structures and the functions and effects thereof are the same as those of the above-described first embodiment.

Embodiment 3

FIG. 14 shows a third embodiment of the present invention.

FIG. 14 is a fragmentary cross section for showing the cross section of the liquid crystal element part near the connected area right before being cut by the laser.

Figure 14A:
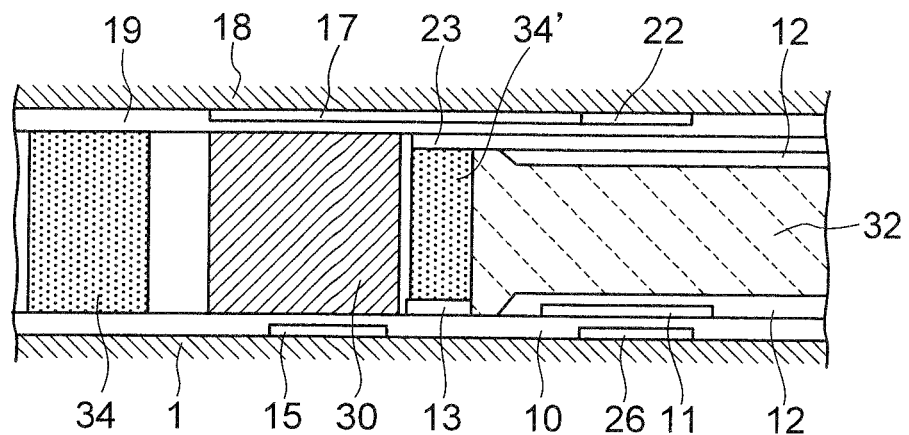
FIG. 14A is an illustration for describing the case where a transfer electrode is arranged on the pixel area side of the binding member.
Figure 14B:
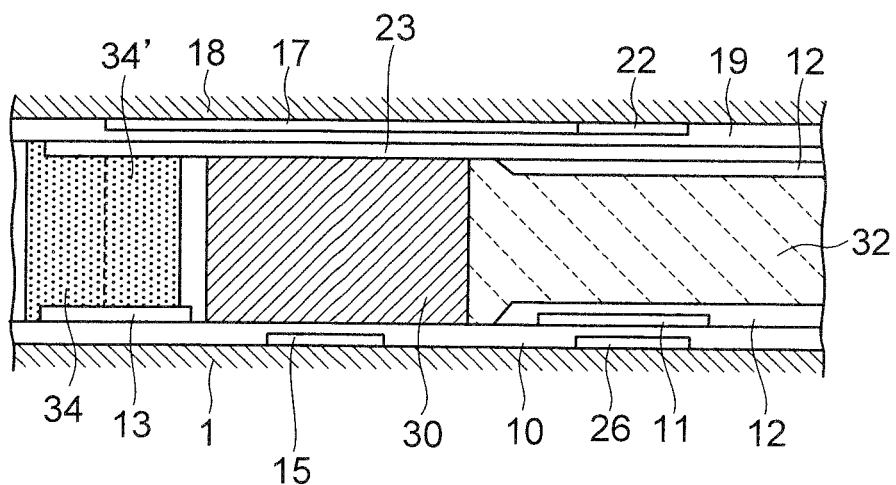
FIG. 14B is an illustration for describing the case where the transfer electrode is arranged on the cutting position side of the binding member.

In the drawing, FIG. 14A illustrates the case where the transfer electrodes 13 and 23 are disposed on the pixel area side of the binding member 30, and FIG. 14B illustrates the case where the transfer electrodes 13 and 23 are disposed on the cutting position side of the binding member 30.

In the structure shown in FIG. 14A, a gap retaining member 34 made of a conductive member is formed on the cutting position, while the other conductive gap retaining member 34' is formed at the position to connect the transfer electrode 15 and the opposing electrode 23 electrically. At that time, it is necessary to keep the electric resistance between the transfer electrode 13 and the opposing electrode 23 to be a value that does not affect the electro-optical characteristic. Thus, it is desirable for the other conductive gap retaining member 34' to have a cross sectional dimension for satisfying that condition.

Further, in the structure shown in FIG. 14B, the conductive gap retaining member 34 is formed on the cutting position as well as at the position to connect the transfer electrode 15 and the opposing electrode 23 electrically. In this embodiment, the black matrix 17 is extendedly provided towards the right under a part of the conductive gap retaining member 34' for not irradiating the laser over the entire surface of the conductive gap retaining member 34.

The third embodiment is distinctive in respect that, as described above, the gape retaining member 34 is formed by using a resin of a material to which conductivity is added, in addition to its characteristic for absorbing the laser that transmits the substrate.

Therefore, the gap retaining member 34 enables the transfer electrode 13 to be connected electrically in the third embodiment, so that it is not necessary to mix a conductive gap agent into a seal (binding agent 30). As a result, the manufacturing cost can be reduced significantly.

In the third embodiment, there is taken a measure for avoiding the contact between the gap retaining member 34 and the pixel electrode 11, for example, and an insulating treatment is applied to prevent the driving circuit of the driving substrate 1 and the counter substrate 18 from being electrically connected through the gap retaining member 34 disposed in the display area of the counter substrate 18 side.

Other structures and the functions and effects thereof are the same as those of the above-described first embodiment.

Embodiment 4

FIG. 15 shows a fourth embodiment of the present invention.

Figure 15A:
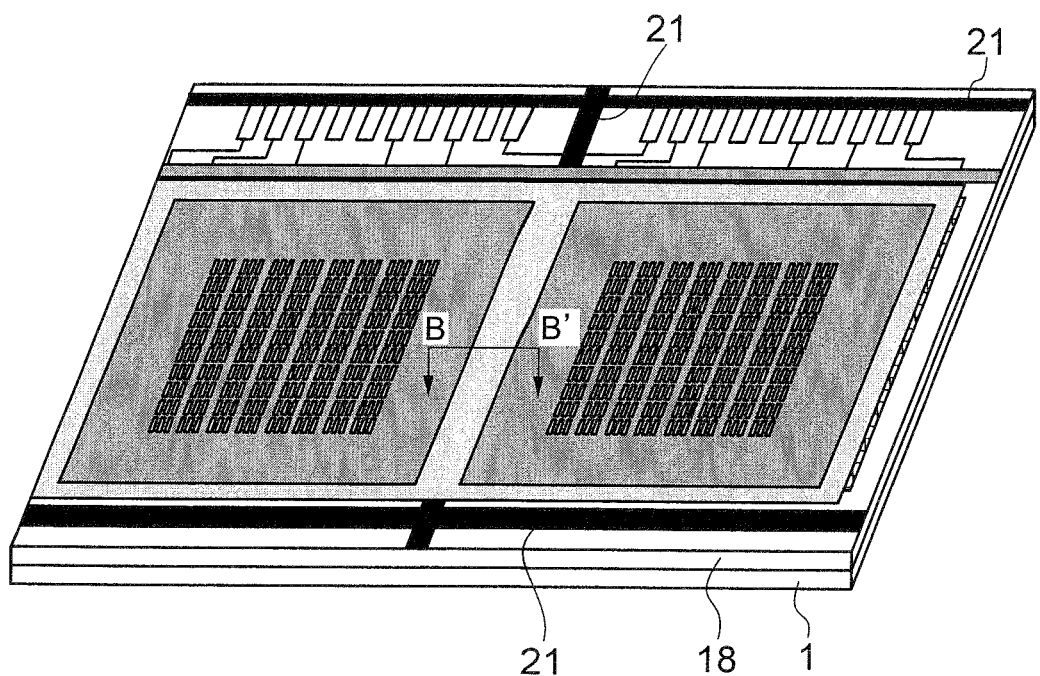
FIG. 15A is a fragmentary perspective view for showing a part of the liquid crystal driving element part right before the laser cutting (after the liquid crystal driving element is being laminated)
Figure 15B:
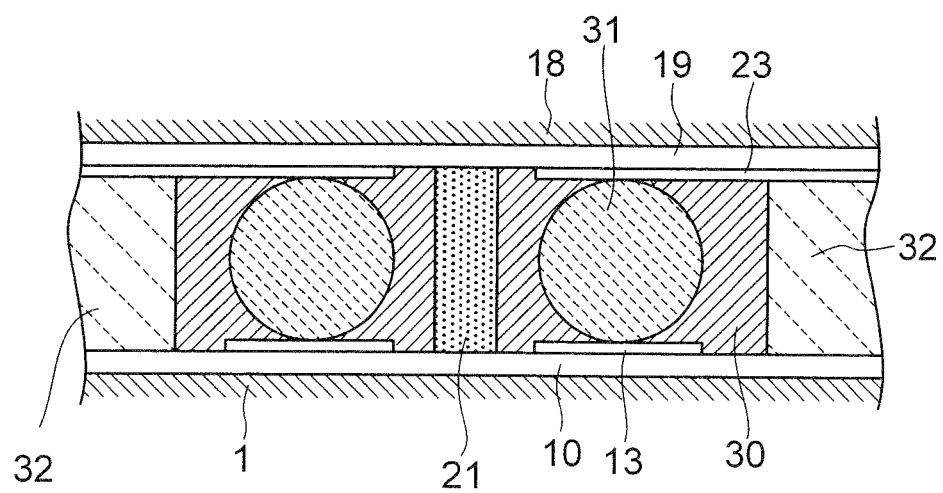
FIG. 15B is a fragmentary cross section taken along the line B-B' of FIG. 15A.

In FIG. 15 for showing the fourth embodiment, FIG. 15A illustrates a perspective view for showing the state after laminating each of the substrates 1 and 18 for forming a plurality of liquid crystal display element parts, and FIG. 15B is a cross section taken along the line B-B' of FIG. 15A.

In the fourth embodiment, the binding member 30 for the neighboring liquid crystal display elements formed on the driving substrate 1 is in one body, and the gap retaining member 21 is formed in the middle thereof.

In this case, normally, the substrates 1, 18 cannot be cut very well when those substrates 1, 18 are cut at the area of the binding member 30, since the binding member 30 itself has the adhesive power. Meanwhile, it is possible with the fourth embodiment shown in FIG. 15 to cut the substrates with high precision at the area of the gap retaining member 21 in the binding member 30.

Thus, with the fourth embodiment shown in FIG. 15, it is possible to cut out the neighboring liquid crystal display elements formed on a large-scaled substrate at the center part of the binding member 30. Therefore, the number of panels manufactured from one substrate can be increased, which gives advantages that the productivity can be improved and the cost can be decreased.

Other structures and the functions and effects thereof are the same as those of the above-described first embodiment.

Embodiment 5

FIG. 16-FIG. 20 illustrate a fifth embodiment of the present invention.

Each of the embodiments above has been described on an assumption that the liquid crystal drop injection method is used as an injection method of the liquid crystal. However, the fifth embodiment will be described by referring to the case where the liquid crystal is injected by utilizing the capillary phenomenon after the step of laminating the substrates.

Figure 16:
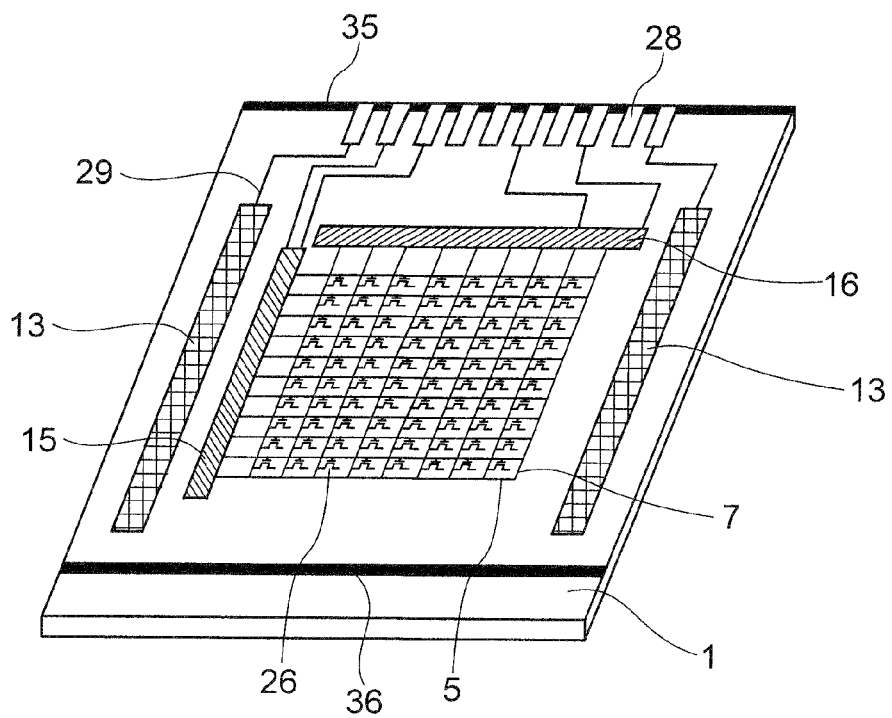
FIG. 16 is an illustration for showing a fifth embodiment of the present invention, which describes the liquid crystal driving element part of the driving substrate.
Figure 17A:
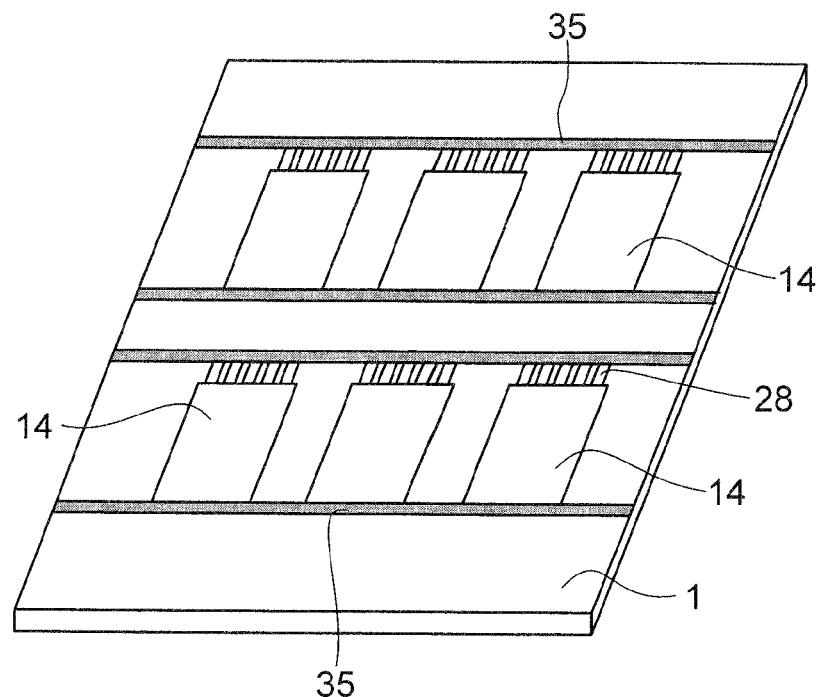
FIG. 17A is an illustration for showing the state after a plurality of the liquid crystal driving elements of the driving substrate are being formed.

As shown in FIG. 16 and FIG. 17, regarding the driving substrate 1 side, it is the same as those of the above-described embodiments for the liquid crystal elements, the driving circuit 15, the transfer electrode 13, and the external connecting terminal 28. When forming the gate electrode 5 or the drain electrode 8, an electrode pattern 35 is formed on the cutting position of the side on the terminal side and a non-transparent electrode pattern 36 is formed on the cutting position of the side on the injection inlet side for the wavelength that transmits the glass substrate.

Figure 17B:
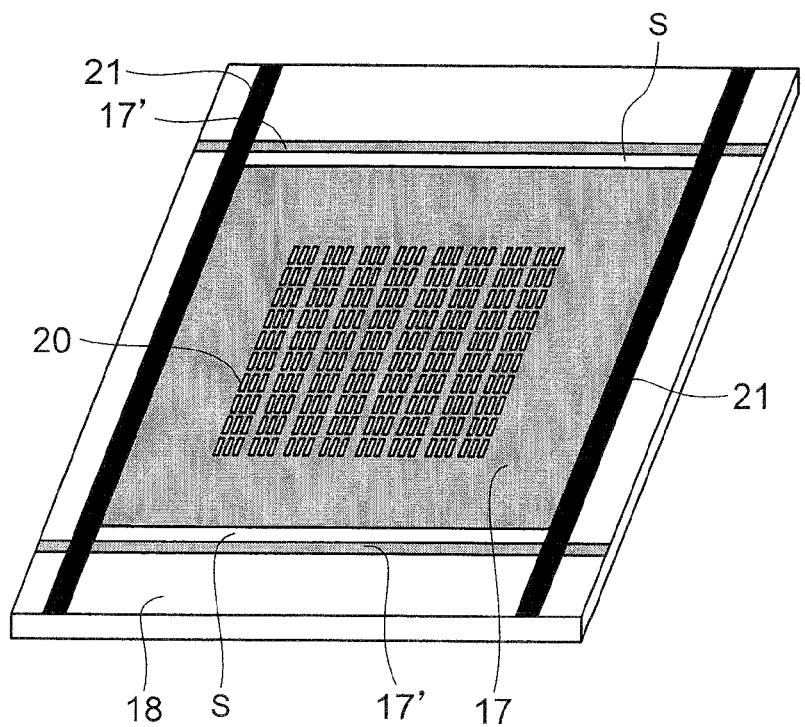
FIG. 17B is an illustration for describing the position of black matrix (17') provided to a single liquid crystal element of the counter substrate side.
Figure 18:
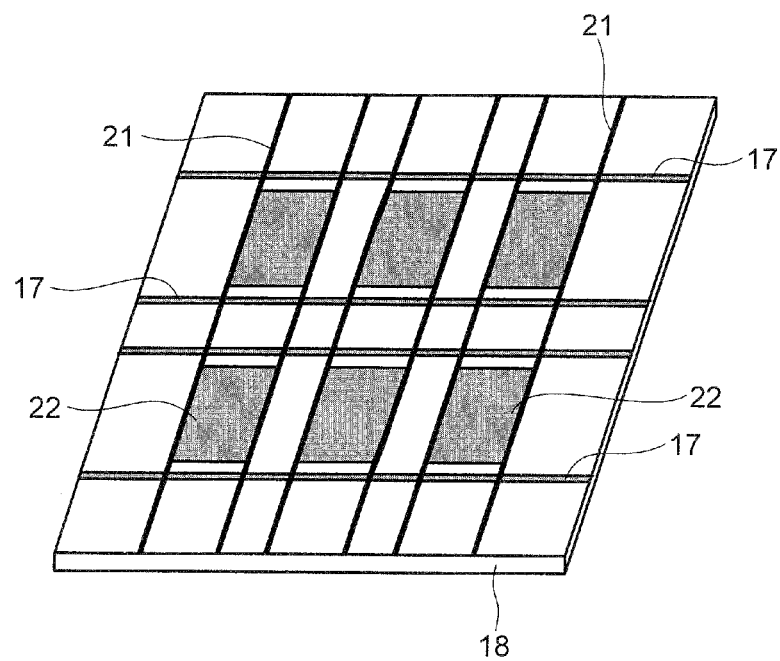
FIG. 18 illustrates the fifth embodiment of the present invention, which describes the state where a plurality of counter substrate side liquid crystal elements are formed on the counter substrate.

As shown in FIG. 17B and FIG. 18, regarding the counter substrate 18 side, the liquid inlet may be blocked after the cutting, and injection cannot be performed if the gap retaining member 21 is formed on the injection inlet side as in the case of the first embodiment. Thus, in the fifth embodiment, the gap retaining member 21 is not formed on the injection inlet side of the counter substrate 18. Instead, a black matrix is formed at the cutting position on the injection inlet side. Further, a space S is provided like the case of the first embodiment, so that the heat generated in the black matrix 17' by the laser irradiation is not transmitted to the black matrix 17 on the pixel area.

Figure 19:
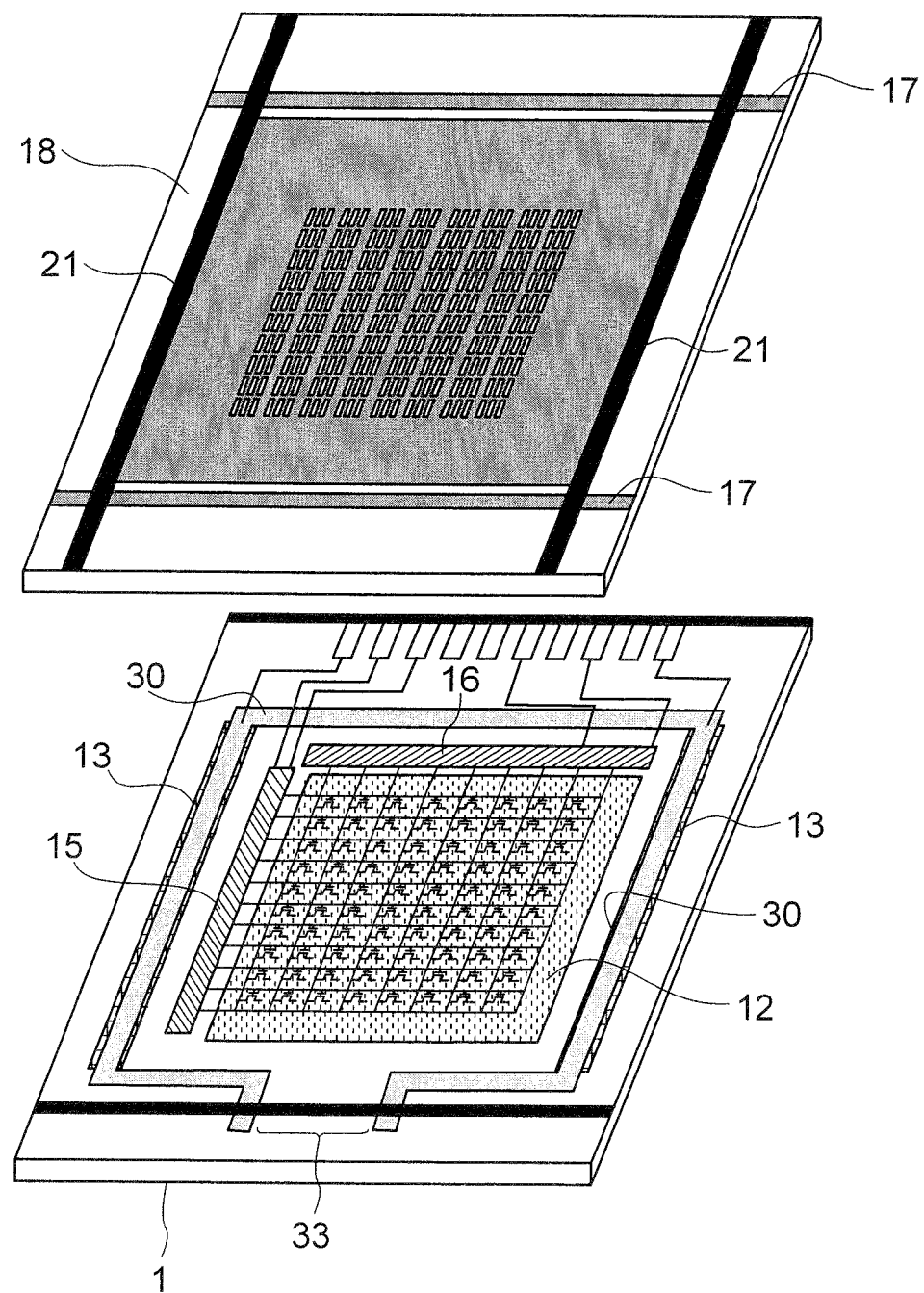
FIG. 19 illustrates the fifth embodiment of the present invention, which describes the state before the liquid crystal driving elements are being laminated.
Figure 20A:
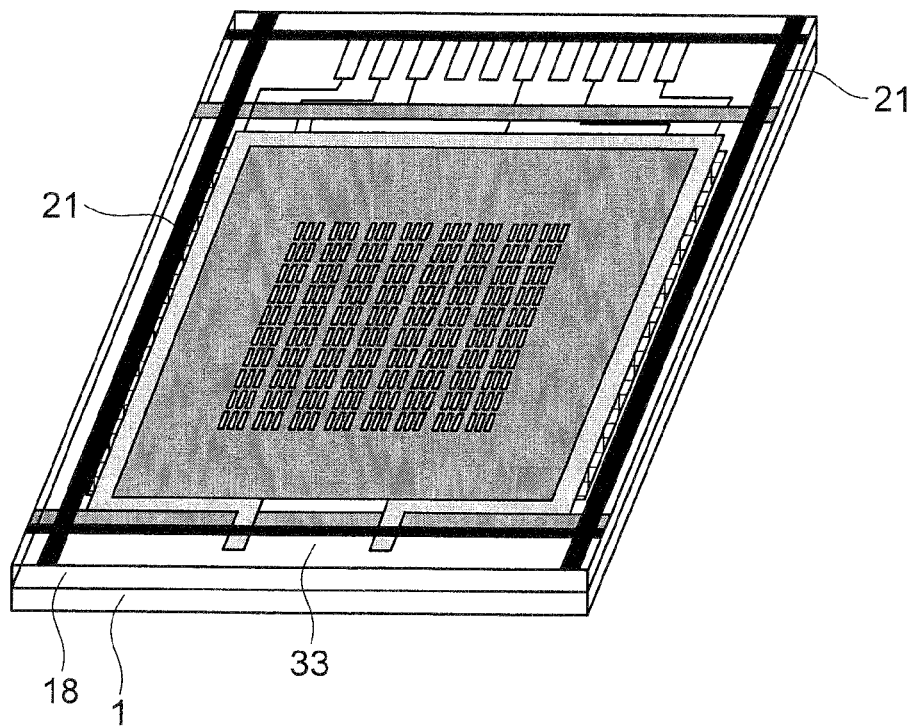
FIG. 20A is an illustration for describing the liquid crystal driving element part before the laser cutting.
Figure 20B:
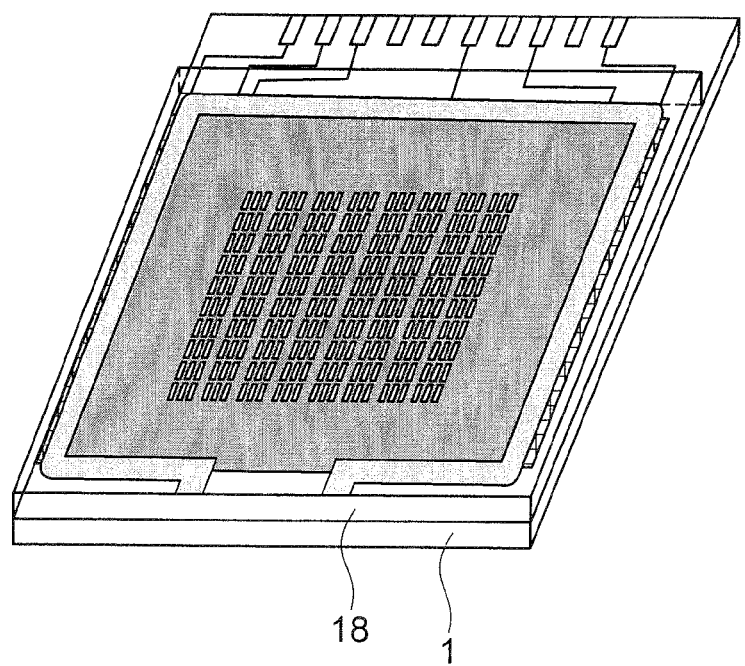
FIG. 20B is an illustration for describing the liquid crystal driving element after the laser cutting.

FIG. 19 is a perspective view of the driving substrate 1 and the counter substrate 18 according to the above-described fifth embodiment before being laminated. FIG. 20 A is a perspective view of the state where the driving substrate 1 and the counter substrate 18 are laminated, and FIG. 20B is a perspective view after the cutting. For cutting the injection inlet side, normal scribe cutting or laser cutting using the laser of the wavelength that is absorbed to the substrate may be employed.

Other structures and the functions and effects thereof are the same as those of the above-described first embodiment.

Embodiment 6

FIG. 21 illustrates a sixth embodiment of the present invention.

Figure 21A:
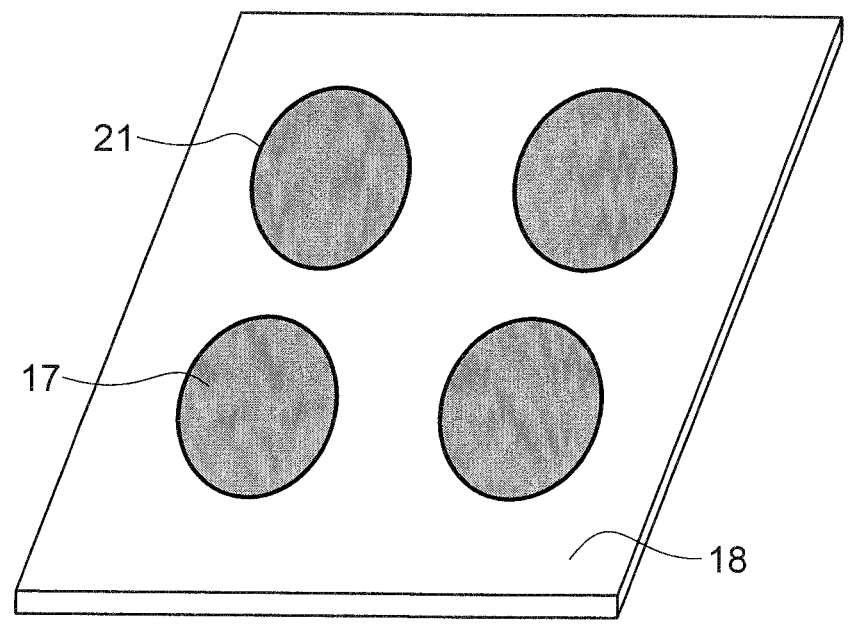
FIG. 21A is an illustration for describing the liquid crystal driving element part of the counter substrate.
Figure 21B:
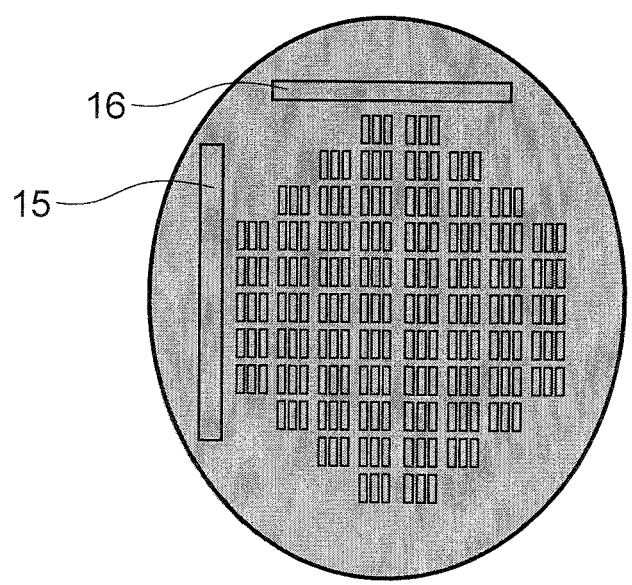
FIG. 21B is an illustration for describing the liquid crystal driving element after the laser cutting.

As shown in FIG. 21A, the sixth embodiment is distinctive in respect that the gap retaining member 21 is formed in circular form in the counter substrate 18, and laser is irradiated along the gap retaining member 21 for obtaining the circular liquid crystal display apparatus. By forming the gap retaining member 21 on the counter substrate 18 in an arbitrary shape by the same method, it is possible to obtain the liquid crystal display apparatus in the arbitrary shape. FIG. 21B is an illustration for describing an example of the liquid crystal driving element formed in the sixth embodiment.

Other structures and the functions and effects thereof are the same as those of the above-described first embodiment.

Embodiment 7

FIG. 22 illustrates a seventh embodiment of the present invention.

Figure 22A:
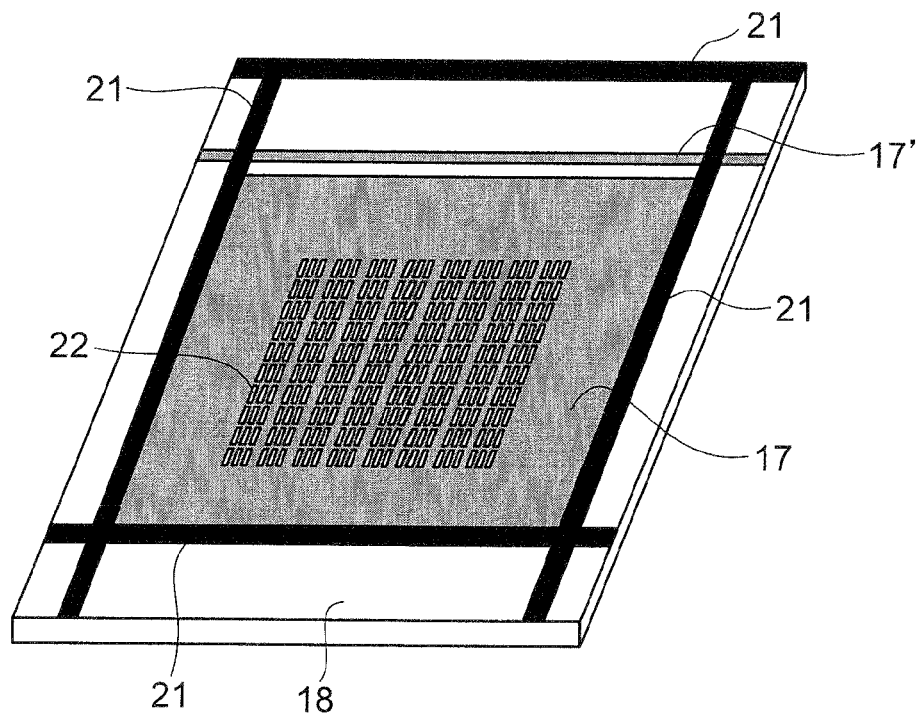
FIG. 22A is an illustration for describing the liquid crystal driving element part of the counter substrate side.
Figure 22B:
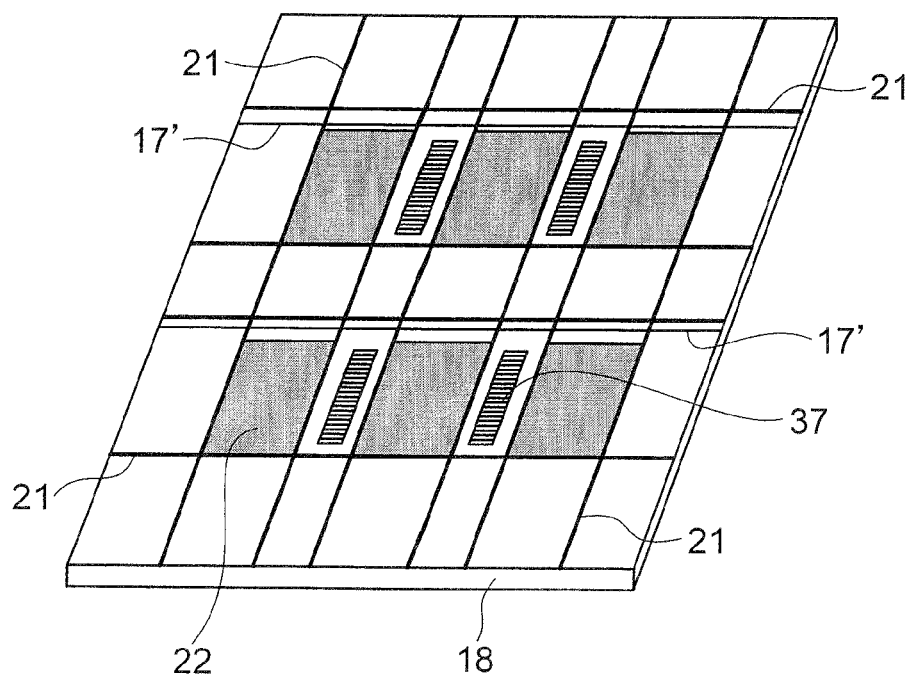
FIG. 22B is an illustration for showing the entire counter substrate side under a state where a plurality of the counter substrate side liquid crystal driving elements are formed.

Each of the embodiments above has been described by referring to the case where the gap retaining member 21 and the black matrix 17' are formed only at the cutting position in the periphery of the liquid crystal driving element. When a test element 37 and the like are formed on the periphery of the liquid crystal driving elements as shown in FIGS. 22A and 22B, it is necessary to cut the substrate to the outside the liquid crystal display element part. Thus, the gap retaining member 21 and the black matrix 17' may be formed at the cutting position towards the end of the substrates 1 and 18.

Other structures and the functions and effects thereof are the same as those of the above-described first embodiment.

Embodiment 8

FIG. 23 illustrates an eighth embodiment of the present invention.

The eighth embodiment relates to a display panel (liquid crystal display apparatus part), which utilizes an organic light-emitting layer 39. FIG. 23A-FIG. 23D show the steps of manufacturing the display panel.

Figure 23A:
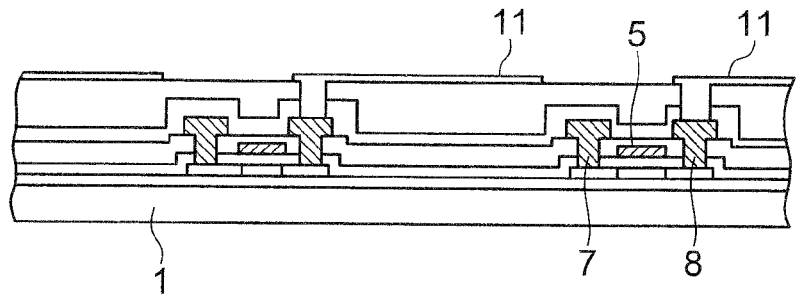
FIG. 23 illustrates the seventh embodiment of the present invention, in which FIG. 23A-FIG. 23D describes the steps of a manufacturing method of an organic light-emitting type display apparatus, respectively.

FIG. 23A is a cross sectional view for showing the thin-film transistor part of an organic light-emitting display apparatus part 50. The procedure of the manufacturing method thereof is almost the same as that of the liquid crystal display apparatus of the above-described first embodiment (FIG. 1).

Figure 23B:
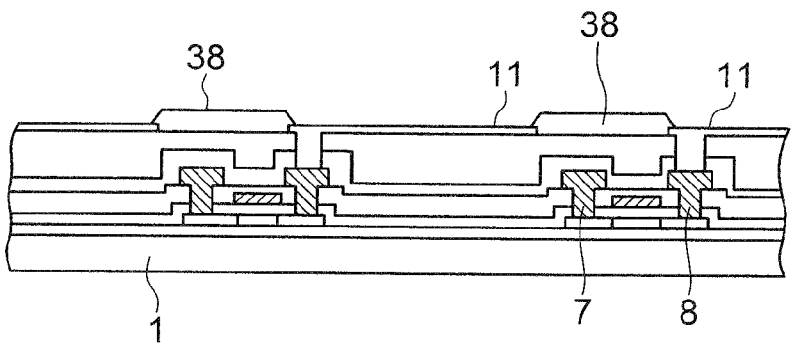

In FIG. 23B, an organic resin is formed as edge protection films 38 between each of the pixel electrodes 11 functioning as the anodes. At the same time, the edge protection film 38 is formed in the part that opposes to the cutting position of the panel. The organic resin used for the edge protection film 38 may be acceptable as long as it has a characteristic to absorb the light of the wavelength that transmits the glass, and has an excellent absorptivity for the wavelength of the laser that is used for cutting at least, and it is desirable to use the acryl resin described in the first embodiment.

Figure 23C:
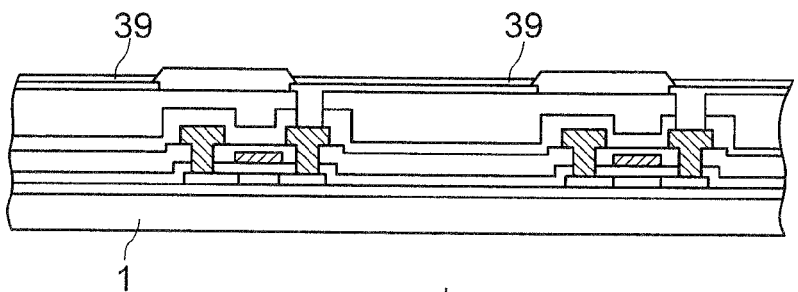
Figure 23D:
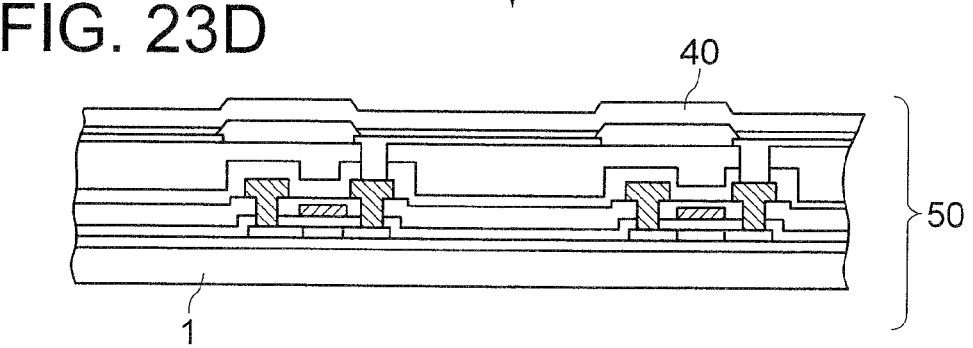
Figure 24A:
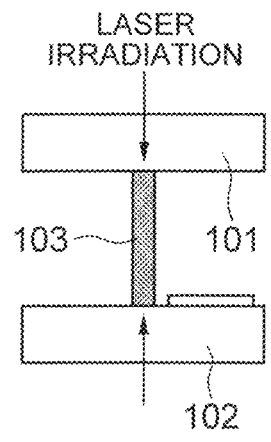
FIG. 24A to FIG. 24D are illustrations for describing a conventional case.
Figure 24B:
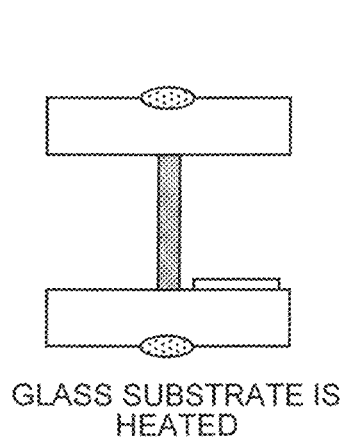
Figure 24C:
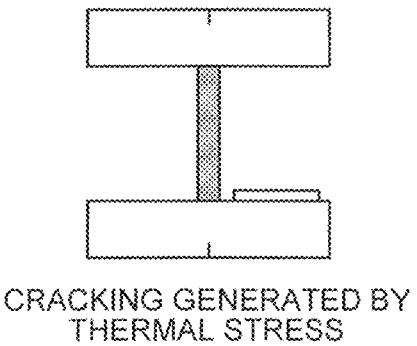
Figure 24D:
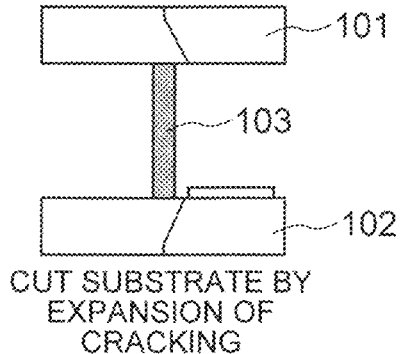

Next, as shown in FIG. 23C, the organic light-emitting layers 39 are formed between each of the edge protection films 38. Subsequently, as shown in FIG. 23D, cathodes 40 are formed.

By forming the resin used for the edge protection film 38 at the cutting position, it is possible to perform laser cutting by using the laser of the wavelength that transmits the substrate 1. As described, it is possible to decrease the thermal load imposed upon the driving circuits in the vicinity of the cutting position and, at the same time, narrow the frame even in the case of the organic light-emitting apparatus of the driving circuit integrated type.

Other Embodiment

Each of the embodiments above has been described by referring to the case where the conductive gap material is mixed to the binding member 30. However, the gap retaining member 21 is disposed near the binding member 30. Thus, it may be structured to use the binding member without mixing the gap material by mounting it to be used in the manner described in the third embodiment (see FIG. 14), for example.

Further, each of the embodiments above has been described by referring to the case where the glass substrates are used for the substrates 1 and 18. However, it is possible to form the liquid crystal display apparatuses that function similarly to those of the above-described embodiments not only with the use of the glass substrates but also with the use of the substrates made of different materials such as plastic substrates, through combining the laser that transmits those substrates and the gape retaining member 21 for absorbing the laser. Thus, the above-described laser cutting method is effective as the cutting method therefor.

Further, each of the embodiments above has been described by referring to the case of a pair of laminated substrates constituted with the driving substrate 1 and the counter substrate 18. However, it is also possible to apply the laser cutting method described in the embodiment to the laminated substrates to which a substrate having another function as, e.g. micro lens, is additionally laminated, by combining the laser that transmits the substrates and the gap retaining member 21 for absorbing the laser, without any modifications. Thus, the method is effective.

Furthermore, for the laser cutting according to each of the above-described embodiments, it is also effective to employ a method that increases the cutting accuracy by increasing the influence of the thermal stress through cooling the stand for supporting the substrates 1 and 18 at the time of laser cutting.

Furthermore, each of the embodiments above has been described by referring to the case where the driving circuits are disposed on the opposite side of the injection inlet and only on one side of the lateral direction. However, the present invention is not limited to the above-described embodiments. For example, the present invention can also be applied without any modifications to the cases where the driving circuits are disposed on both sides of the lateral direction, etc., as long as it is within the scope of the same technical spirit.

What is claimed is:

1. A laser cutting method for cutting a laminated glass substrate that is formed by laminating at least a pair of glass substrates, comprising the steps of:

providing a pattern member between the pair of the glass substrates in a manner that the pattern member is contacting inner sides of both of the glass substrates and along a cutting position of the laminated glass substrate, the pattern member having a characteristic of absorbing light of a wavelength that transmits through either of the glass substrates;

cooling the laminated glass substrate;

while cooling the laminated glass substrate, generating heat in the pattern member by irradiating a surface side of a first one of the glass substrates of the laminated glass substrate with a laser beam of the wavelength that transmits through the glass substrates and letting the laser beam transmit through the first one glass substrate to irradiate the pattern member, wherein in irradiating of the surface side of the first one glass substrate with the laser beam, the laser beam irradiates the laminated glass substrate only through an exterior surface of the surface side of the first one glass substrate from one side; and cutting both of the pair of glass substrates at once by generating cracking from and at an inner part of each of the glass substrates in contact with the pattern member by using the heat transferred from the pattern member to both of the glass substrates forming the laminated glass substrate, whereby the laminated glass substrate is cut along the pattern member along a generated crack.

2. The laser cutting method as claimed in claim 1, wherein the pattern member is formed with a gap retaining member that is provided between the pair of glass substrates.

3. The laser cutting method as claimed in claim 2, wherein one of the pair of glass substrates is a driving glass substrate and the other one is a counter glass substrate that is equipped with a display part, the method further comprising the step of, before laminating each of the glass substrates:

forming a flattening film on the driving glass substrate and an overcoat layer on the counter glass substrate, respectively, except for a part where the gap retaining member is provided.

4. The laser cutting method as claimed in claim 3, wherein:

a plurality of external connecting terminals are provided at an edge part of the driving glass substrate; and a black matrix that is a black straight line for performing laser cutting is provided to the counter glass substrate at an area opposing to the external connecting terminals, before laminating the glass substrates.

5. The laser cutting method as claimed in claim 2, wherein the gap retaining member is formed with a member that has thermal conductivity as well as a characteristic of absorbing the light of the wavelength that transmits through the glass substrates.

6. A manufacturing method of a display apparatus, comprising the steps of:
   providing a formed laminated glass substrate comprised of a pair of glass substrates and pattern member; and
   using the cutting method of claim 1, cutting a plurality of display apparatus parts from the formed laminated glass substrates;
   wherein one of the pair of glass substrates is equipped with a plurality of display driving devices, and the other glass substrate comprises a plurality of display devices which correspond to the display driving devices and are driven by the display driving devices.

7. The manufacturing method of a display apparatus as claimed in claim 6, wherein the display devices are liquid crystal display devices formed by a liquid crystal dropping injection method.

8. The laser cutting method as claimed in claim 1, wherein the step of cooling the laminated glass substrate comprises the laminated glass substrate being supported by a stand, and the step of cooling the laminated glass substrate occurs during cutting by the stand providing a function of cooling the laminated glass substrate to thereby increase a thermal stress influence.

9. The laser cutting method as claimed in claim 1, wherein the step of cooling the laminated glass substrate comprises the laminated glass substrate being supported by a stand, and the step of cooling the laminated glass substrate occurs during cutting by the stand providing a function of cooling a surface side of a second one of the glass substrates of the laminated glass substrate to thereby increase a thermal stress influence of the heat transferred from the pattern member to both of the glass substrates forming the laminated glass substrate.

10. The laser cutting method as claimed in claim 1, wherein,
    the first one glass substrate is a counter glass substrate equipped with a display part, and
    the second one glass substrate is a driving glass substrate constituted with pixel-driving polycrystalline silicon thin-film transistors and driving circuits.

11. The laser cutting method as claimed in claim 8, wherein,
    the first one glass substrate is a counter glass substrate equipped with a display part, and
    the second one glass substrate is a driving glass substrate constituted with pixel-driving polycrystalline silicon thin-film transistors and driving circuits.

12. The laser cutting method as claimed in claim 9, wherein,
    the first one glass substrate is a counter glass substrate equipped with a display part, and
    the second one glass substrate is a driving glass substrate constituted with pixel-driving polycrystalline silicon thin-film transistors and driving circuits.

* * * * *